United States Patent
Gopinath et al.

(10) Patent No.: US 7,917,770 B2
(45) Date of Patent: Mar. 29, 2011

(54) CONFIGURABLE DATA MASKING FOR SOFTWARE TESTING

(75) Inventors: Ashok Gopinath, Bangalore (IN); Kolluru Venkata Surya Narayana Sastry, Bangalore (IN); Rajiv Sethumadhavan, Bangalore (IN); Sujith Kizhakkel, Bangalore (IN)

(73) Assignee: Infosys Technologies Ltd., Bangalore (IN)

( * ) Notice: Subject to any disclaimer, the term of this patent is extended or adjusted under 35 U.S.C. 154(b) by 749 days.

(21) Appl. No.: 11/869,690

(22) Filed: Oct. 9, 2007

(65) Prior Publication Data
US 2008/0133934 A1 Jun. 5, 2008

(30) Foreign Application Priority Data
Oct. 10, 2006 (IN) .............. 1880/CHE/2006

(51) Int. Cl.
*H04L 9/32* (2006.01)
*H04N 7/167* (2006.01)
(52) U.S. Cl. ............ 713/189; 380/205; 726/26
(58) Field of Classification Search ............ 726/26–30; 713/176, 189, 193–194; 380/54, 205–209
See application file for complete search history.

(56) References Cited

U.S. PATENT DOCUMENTS

| | | | |
|---|---|---|---|
| 6,275,824 B1 * | 8/2001 | O'Flaherty et al. ............ 1/1 |
| 7,110,982 B2 * | 9/2006 | Feldman et al. ............ 705/51 |
| 2006/0074897 A1 | 4/2006 | Fergusson | |
| 2007/0110224 A1 | 5/2007 | Gumpel et al. | |
| 2007/0130106 A1 | 6/2007 | Gadiraju | |

OTHER PUBLICATIONS

"About Data Masker Substitution Rules," Net 2000 Ltd., visited Oct. 5, 2007, 2 pages. http://www.datamasker.com/dmrule_u.htm.
Data Masker Key Features ("What Does the Data Masker Software Do?"), downloaded Oct. 2, 2007, 1 page.
"Data masking with IBM Global Services, IBM WebSphere Information Analyzer and IBM WebSphere DataStage: Safeguarding critical business data and customer privacy," IBM Corporation, Jun. 2007, 4 pages.
Data Sanitation Techniques, A Net 2000 Ltd. White Paper, downloaded Oct. 2, 2007, 10 pages.
Data Scrambling Issues, A Net 2000 Ltd. White Paper, downloaded Oct. 2, 2007, 11 pages.
"Extract, Transform, Load," Wikipedia, visited Oct. 5, 2007, 4 pages.
"Mersenne Twister," Wikipedia, visited Oct. 2, 2007, 5 pages.
"The Data Masker," Net 2000 Ltd., visited Oct. 5, 2007, 3 pages.
"The Data Masker Data Sets," Net 2000 Ltd., archived Jul. 7, 2006, 4 pages. http://www.datamasker.com/dmdatasets.htm.
"The Data Masker Masking Rule Options," Net 2000 Ltd., archived Jul. 12, 2006, 3 pages. http://www.datamasker.com/dmruleoptions.htm.
"The Data Masker User Defined Procedures," Net 2000 Ltd., archived Jul. 8, 2006, 3 pages. http://www.datamasker.com/dmuserdefproc.htm.

* cited by examiner

*Primary Examiner* — Hosuk Song
(74) *Attorney, Agent, or Firm* — Klarquist Sparkman, LLP

(57) ABSTRACT

A data masking tool can support a wide variety of data sources and execution mechanisms. For example, any of a wide variety of data masking techniques can be achieved via a web interface, API, command line, SOA, or the like. Connectivity to mainframe environments can be achieved. Multiple data source types and data to and from different technology platform types can be supported. The tool can support interfacing with a metadata management tool. High quality randomness can be provided by a Mersenne Twister random number generator. The tool can be useful for performing data masking during software testing without having to write data masking code.

16 Claims, 40 Drawing Sheets

EXECUTABLE DATA MASKING TASK
1200

DATA MASKING PROFILE$_1$
DATA MASKING PROFILE$_2$
.
.
.
DATA MASKING PROFILE$_N$

| Production Data | | Masked Data | |
|---|---|---|---|
| Name | SSN | Name | SSN |
| John Doe | 012-34-5678 | ZZZ ZZZZZ | 012-34-5678 |
| Peter Smith | 123-45-6789 | ZZZ ZZZZZ | 123-45-6789 |
| Santa Claus | 234-56-7890 | ZZZ ZZZZZ | 234-56-7890 |

FIG. 31B

| Production Data | | Masked Data | |
|---|---|---|---|
| Name | SSN | Name | SSN |
| John Doe | 012-34-5678 | Mel Gibson | 012-34-5678 |
| Peter Smith | 123-45-6789 | Roger Moore | 123-45-6789 |
| Santa Claus | 234-56-7890 | David Beckham | 234-56-7890 |

| Name |
|---|
| Mel Gibson |
| Roger Moore |
| David Beckham |

FIG. 31C

| Production Data | | Masked Data | |
|---|---|---|---|
| Name | Date of Joining | Name | Date of Joining |
| John Doe | 01-Jan-2005 | John Doe | 22-Dec-2005 |
| Peter Smith | 01-Jan-2005 | Peter Smith | 07-Jul-2005 |
| Santa Claus | 01-Jan-2005 | Santa Claus | 16-Mar-2005 |

| Production Data | | Masked Data | |
|---|---|---|---|
| Name | SSN | Name | SSN |
| John Doe | 012-34-5678 | sjk*s$12(L; | 012-34-5678 |
| Peter Smith | 123-45-6789 | ;sdHck&5# | 123-45-6789 |
| Santa Claus | 234-56-7890 | ~jhYi*^s)9Ip | 234-56-7890 |

FIG. 32B

| Production Data | | Masked Data | |
|---|---|---|---|
| Name | SSN | Name | SSN |
| John Doe | 012-34-5678 | Santa Claus | 012-34-5678 |
| Peter Smith | 123-45-6789 | John Doe | 123-45-6789 |
| Santa Claus | 234-56-7890 | Peter Smith | 234-56-7890 |

FIG. 32

CONFIGURABLE DATA MASKING FOR SOFTWARE TESTING

BACKGROUND

Software testing is an integral part of software development. Ideally, the data used when testing software will resemble live data that is expected when the software is deployed. However, for security reasons, live data is not always available.

For example, some software deals with personal or confidential information. A banking application may access a database that has names, addresses, social security numbers, and bank balances of customers. Besides possibly being in violation of the law, providing such information to testers may not be desirable because the testing environment might not otherwise need to have the security safeguards in place to adequately protect the data.

Accordingly, testing may be done with data that does not resemble live data. However, such an approach can easily lead to inadequate testing. As a result, certain problems with the software are later found after the application is put into production, leading to dissatisfied users.

Although there are certain data masking software packages available, they are not sufficiently flexible and do not lend themselves well to use in a variety of settings.

Therefore, there still remains need for technologies to address shortcomings of current data masking techniques.

SUMMARY

A variety of techniques can be used for supporting data masking. As described herein, a wide variety of data sources and execution mechanisms can be supported. Configuration for a wide variety of scenarios can be achieved via a configurable data masking tool without having to write data masking code.

A configurable data masking tool that can be accessed in a variety of ways can be helpful because developers need not start from scratch or re-code if data masking is desired for a particular software development project. Instead, the tool can easily be tailored to work within the particularities of the project via configuration data.

Flexibility of a data masking tool can accommodate data from a variety of sources, including different technology platform types.

The data masking tool can input and output data in a common, editable format (e.g., extensible markup language) so that a variety of other tools can be used.

Data can be extracted from a metadata management tool to avoid re-entry of data.

If desired, a Mersenne Twister random number generation technique can be employed for high quality randomness.

As described herein, a variety of other features and advantages can be incorporated into the technologies as desired.

The foregoing and other features and advantages will become more apparent from the following detailed description of disclosed embodiments, which proceeds with reference to the accompanying drawings.

BRIEF DESCRIPTION OF THE FIGURES

FIG. 12 is a block diagram of an exemplary executable data masking task.

FIGS. 18, 19, 20, 21, 22, 23, 24, 25, 26, 27, 28, and 29 are screen shots of a web interface to a data masking tool.

FIGS. 31A-C and FIGS. 32A-B show exemplary data masking rules.

DETAILED DESCRIPTION

EXAMPLE 1

Exemplary System Employing a Combination of the Technologies

Figure 1:
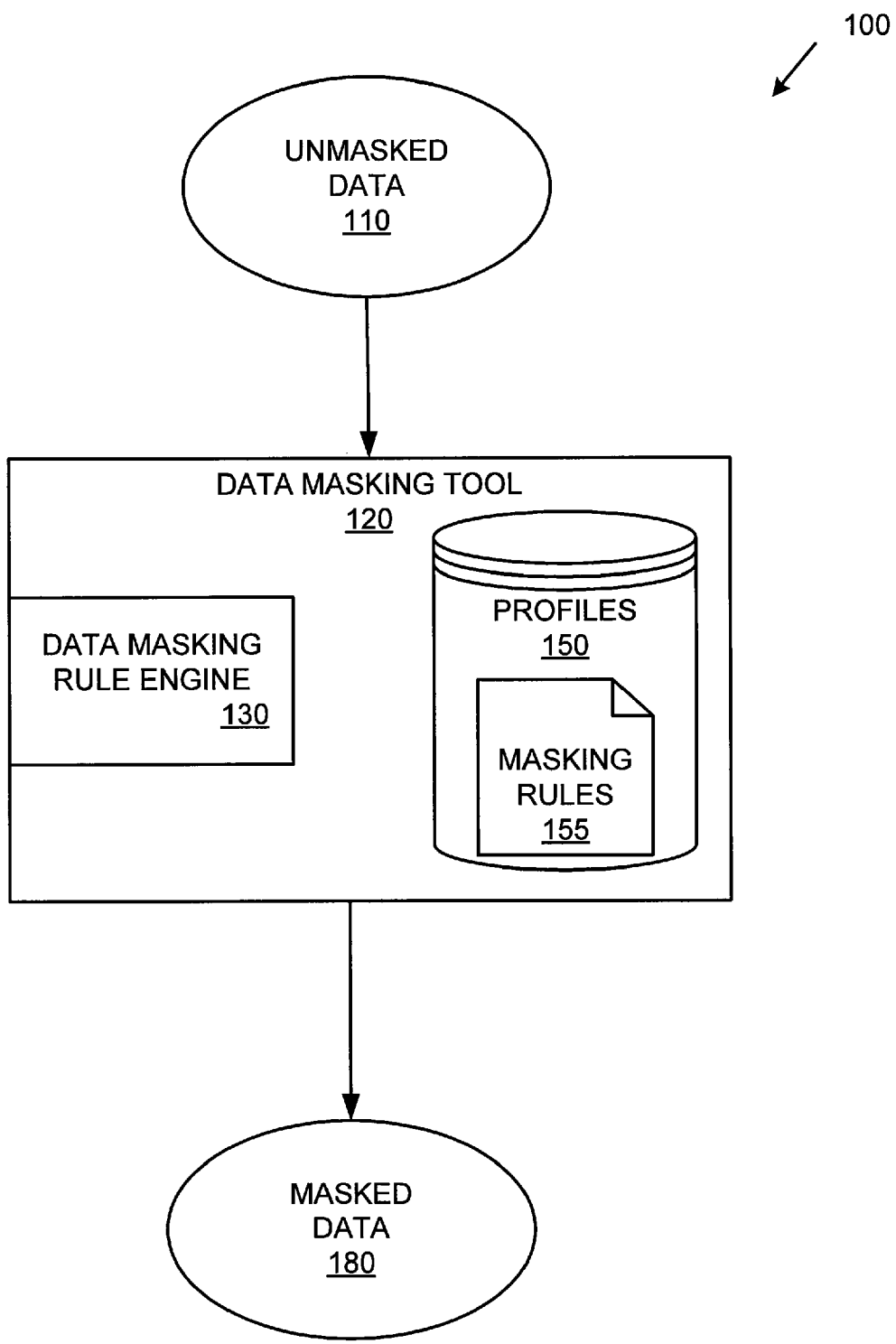
FIG. 1 is a block diagram of an exemplary data masking tool.

FIG. 1 is a block diagram of an exemplary data masking system 100. The system 100 and variants of it can be used to perform any of the methods described herein.

In the example, the data masking tool 120 is configured to receive unmasked data 110 (e.g., source data) and output masked data 180 (e.g., output data). The data masking tool 120 can include a data masking rule engine 130 that supports any of a variety of masking rules (e.g., static substitution rules, dataset substitution rules, random substitution rules, shuffling rules, encryption rules, and the like).

The data masking tool 120 can also store a plurality of data masking profiles 150 that specify configuration settings for various data masking scenarios, including one or more masking rules 155 per scenario. In practice, the data masking profiles 150 can be stored outside of the tool 120. In some implementations, configuration data can be specified without storing a profile with the tool 150.

In practice, the system 100 can be more complicated, with additional functionality, features, and the like.

EXAMPLE 2

Exemplary Perspectives

Although some of the examples assume the perspective of the data masking tool 120, the methods described herein can be implemented from other perspectives (e.g., from the perspective of a hosting application or from one or more client applications). For example, although the terminology "receiving unmasked data" can used from the perspective of the data masking tool 120, such an act could also be described as "sending unmasked data" from the perspective of a client application.

EXAMPLE 3

Exemplary Method Employing a Combination of the Technologies

Figure 2:
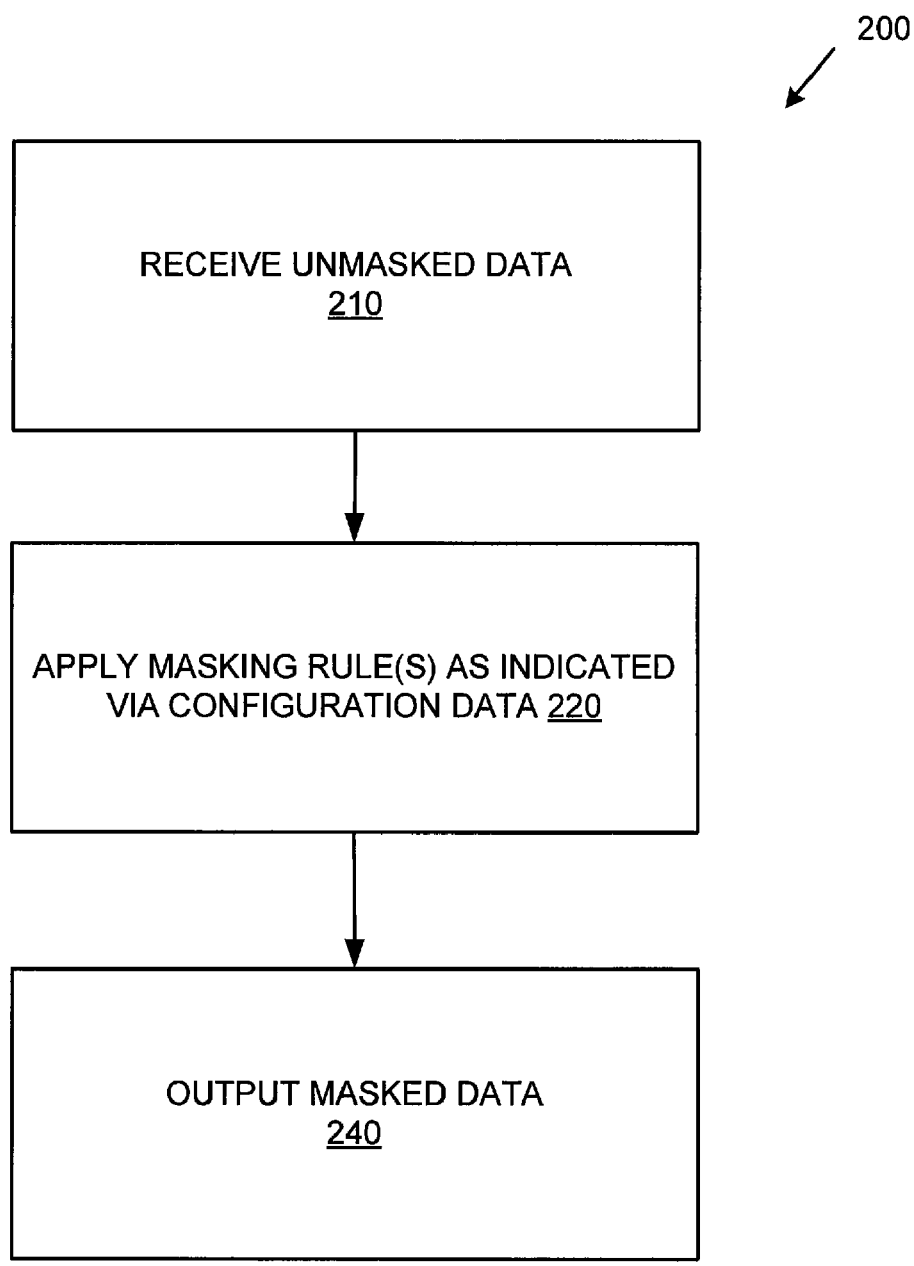
FIG. 2 is a flowchart of an exemplary method of masking data and can be implemented in a data masking tool such as that shown in FIG. 1.

FIG. 2 is a flowchart of an exemplary method 200 of masking data and can be implemented in a data masking tool such as that shown in FIG. 1. At 210, unmasked data is received (e.g., by the tool). For example, as described herein, flat file or database data can be received.

At 220, one or more masking rules are applied (e.g., by a data masking rule engine) to the unmasked data as indicated via configuration data (e.g., in a profile or the like).

At 240, the masked data is output.

The method 200 and any of the methods described herein can be performed by computer-executable instructions stored in one or more computer-readable media (e.g., storage or other tangible media).

EXAMPLE 4

Exemplary Data Masking Configuration Data

In any of the examples herein, data masking configuration data can include any of a variety of information by which data masking can be configured. For example, the configuration data can indicate which data masking rules are to be applied to which data (e.g., which table columns).

To facilitate interchangeability of the data masking configuration data, the data masking tool can both send and receive the data masking configuration data as Extensible Markup Language (XML).

To facilitate editing in XML editors and metadata tool, fields can be stored as human-readable names. For example, indications of columns or fields can be stored as column or field names, data types can be stored as human-readable words (e.g., "number," "varchar," "date," and the like), masking rules stored as human readable words (e.g., "no rule," "static substitution," "dataset substitution," "random substitution," "encryption," "shuffling," and the like), and the like.

The XML generated by the data masking tool can be sufficient to completely reconfigure it to perform the data masking a second or subsequent time. If desired, such XML can be edited using any XML editor, including a text editor.

EXAMPLE 5

Exemplary Data Masking Tool with API

Figure 3:
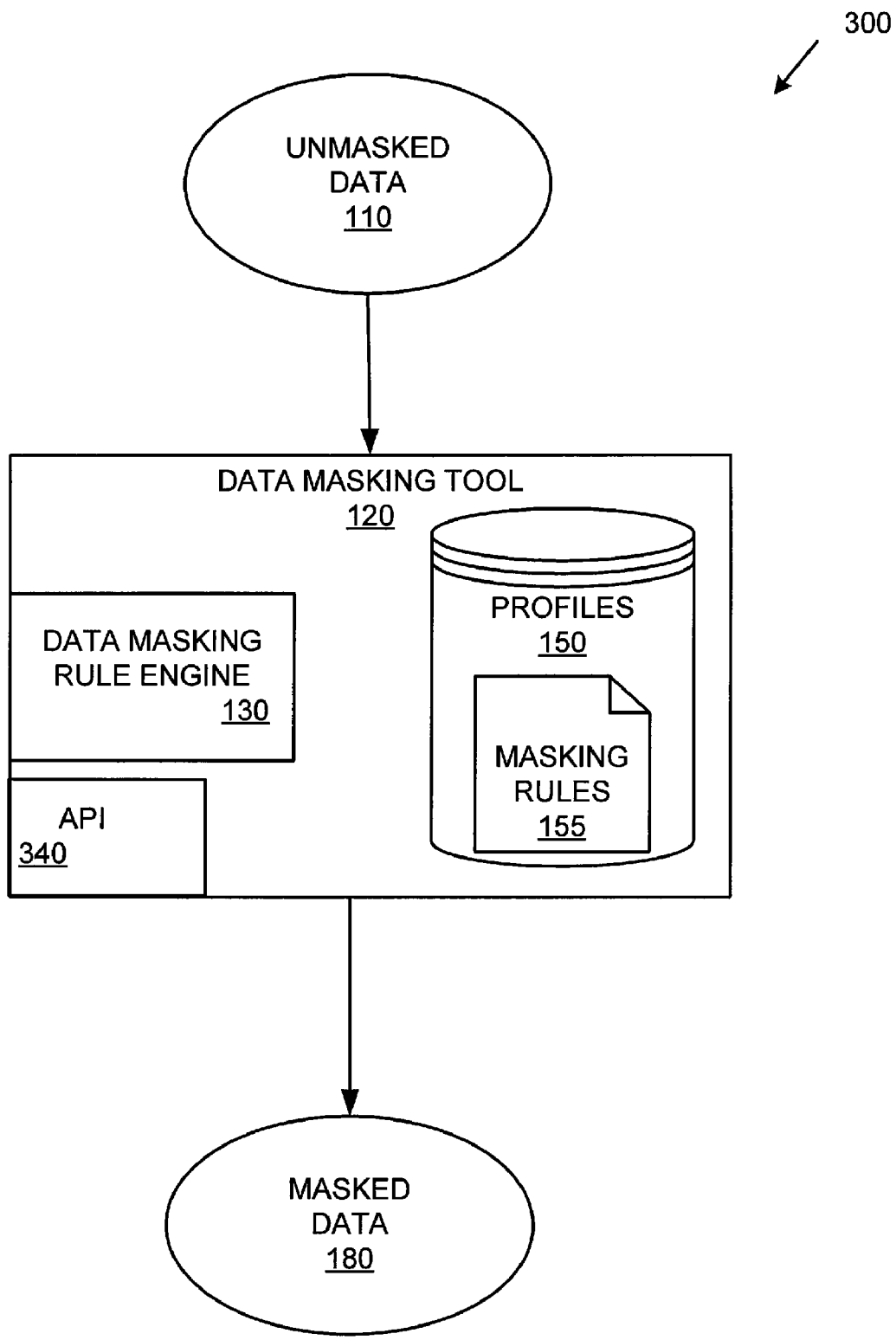
FIG. 3 is a block diagram of an exemplary data masking tool with an application programming interface (API).

FIG. 3 is a block diagram of an exemplary data masking tool 300 having an application programming interface (API) 340. The data masking tool 300 can be similar to that of FIG. 1 but also include an application programming interface 340.

The API can be used to invoke functionality of the data masking tool 320 as described herein. The API can be used to perform data masking as indicated in one or more of the profiles 150 or according to other configuration data as indicated via calls to the API 340.

Figure 4:
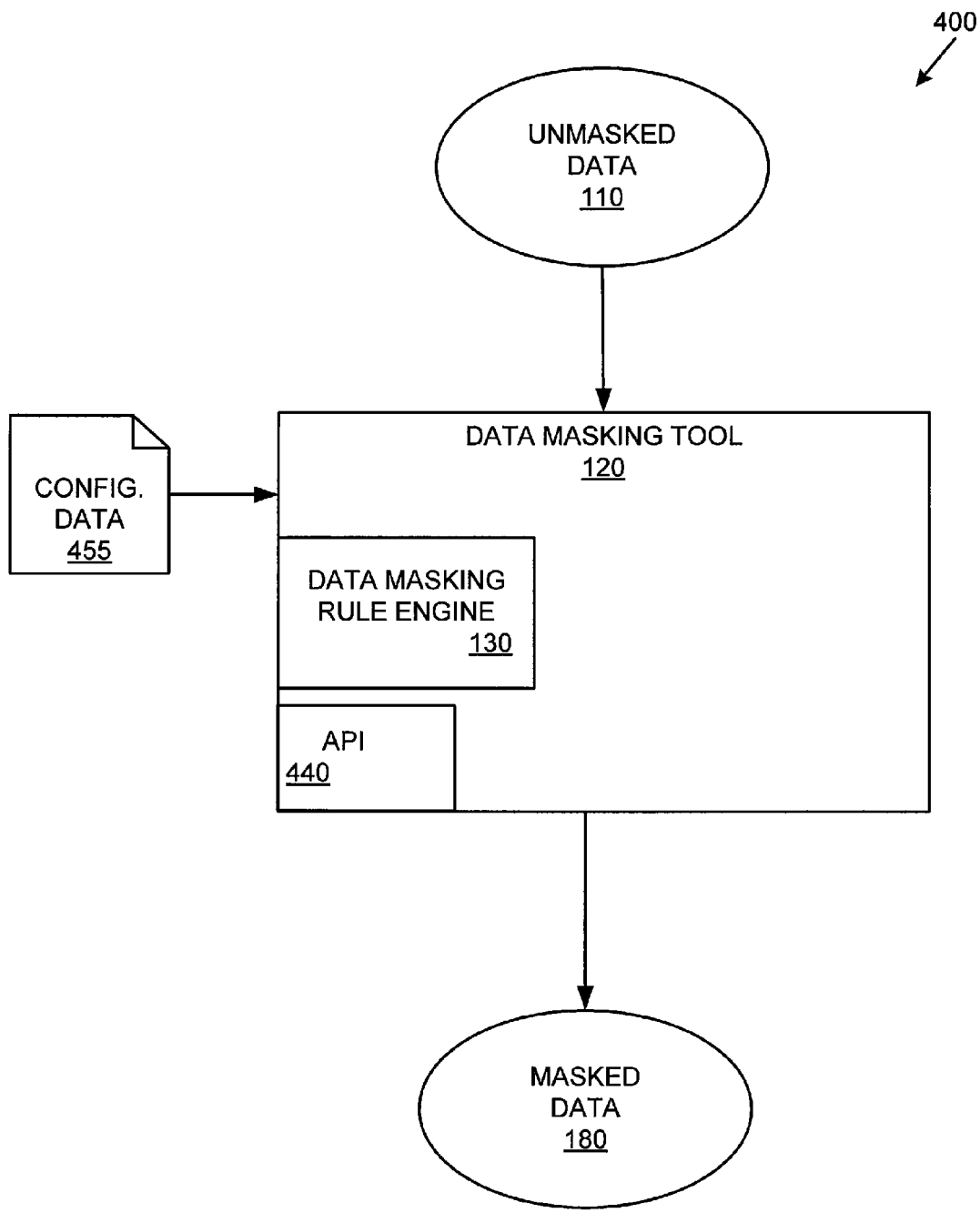
FIG. 4 is a block diagram of an exemplary data masking tool with an application programming interface (API) that can be used to specify configuration data outside of the tool.

FIG. 4 is a block diagram of an exemplary data masking tool 400 with an application programming interface (API) 440 that can be used to specify configuration data 455 outside of the tool 400. For example, a call to the API 440 can indicate the location of a configuration data file or specify a block of configuration data in the call.

EXAMPLE 6

Exemplary Method of Applying API

Figure 5:
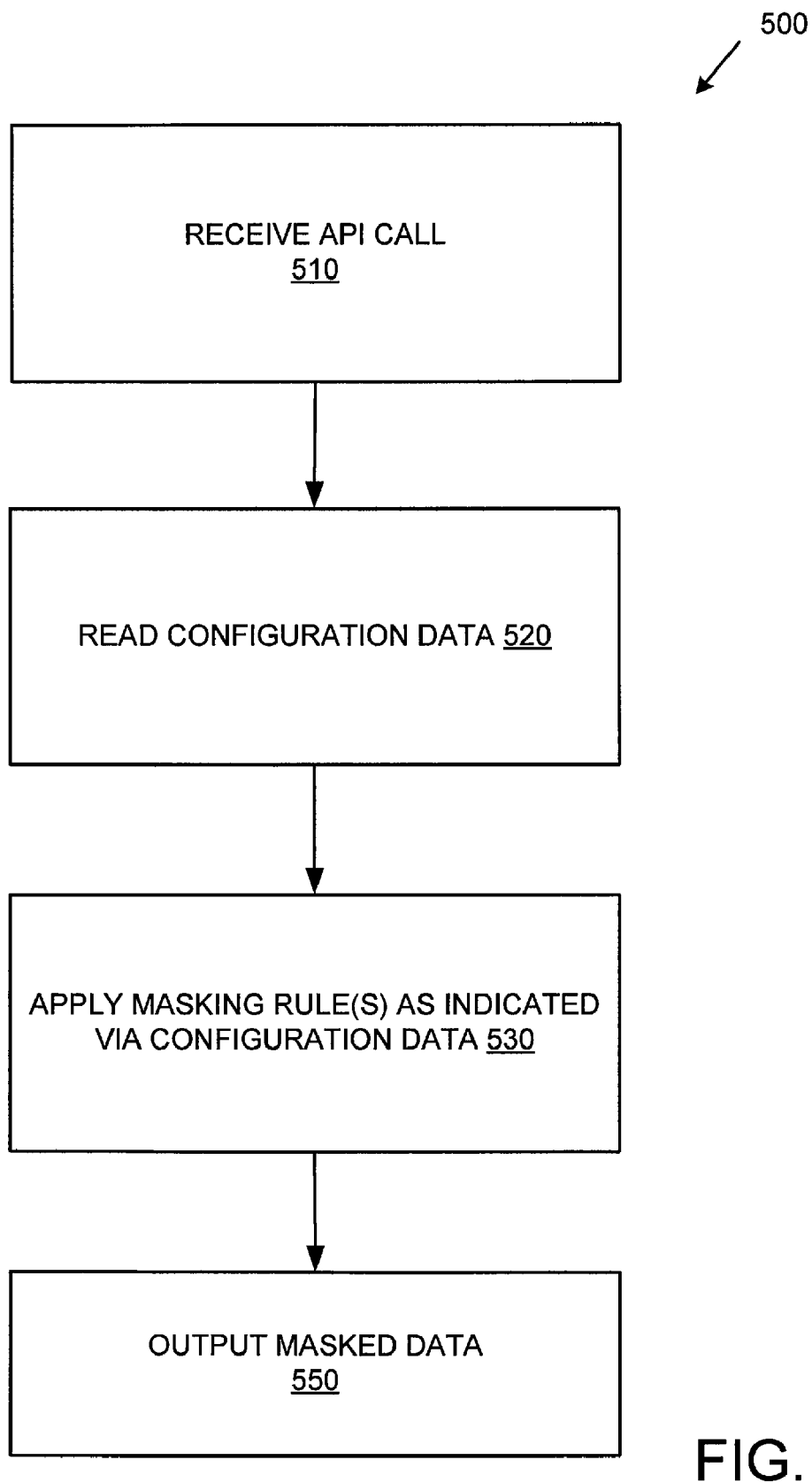
FIG. 5 is a flowchart of an exemplary method of masking data in response to a call to an application programming interface.

FIG. 5 is a flowchart of an exemplary method 500 of masking data in response to a call to an application programming interface and can be implemented in a data masking tool such as that shown in FIG. 3 or 4.

At 510, a call to the API is received.
At 520, responsive to the call, configuration data is read.
At 530, masking rules are applied (e.g., by a data masking engine) as indicated via configuration data.
At 550, the masked data is output.

EXAMPLE 7

Exemplary Execution Mechanisms

Figure 6:
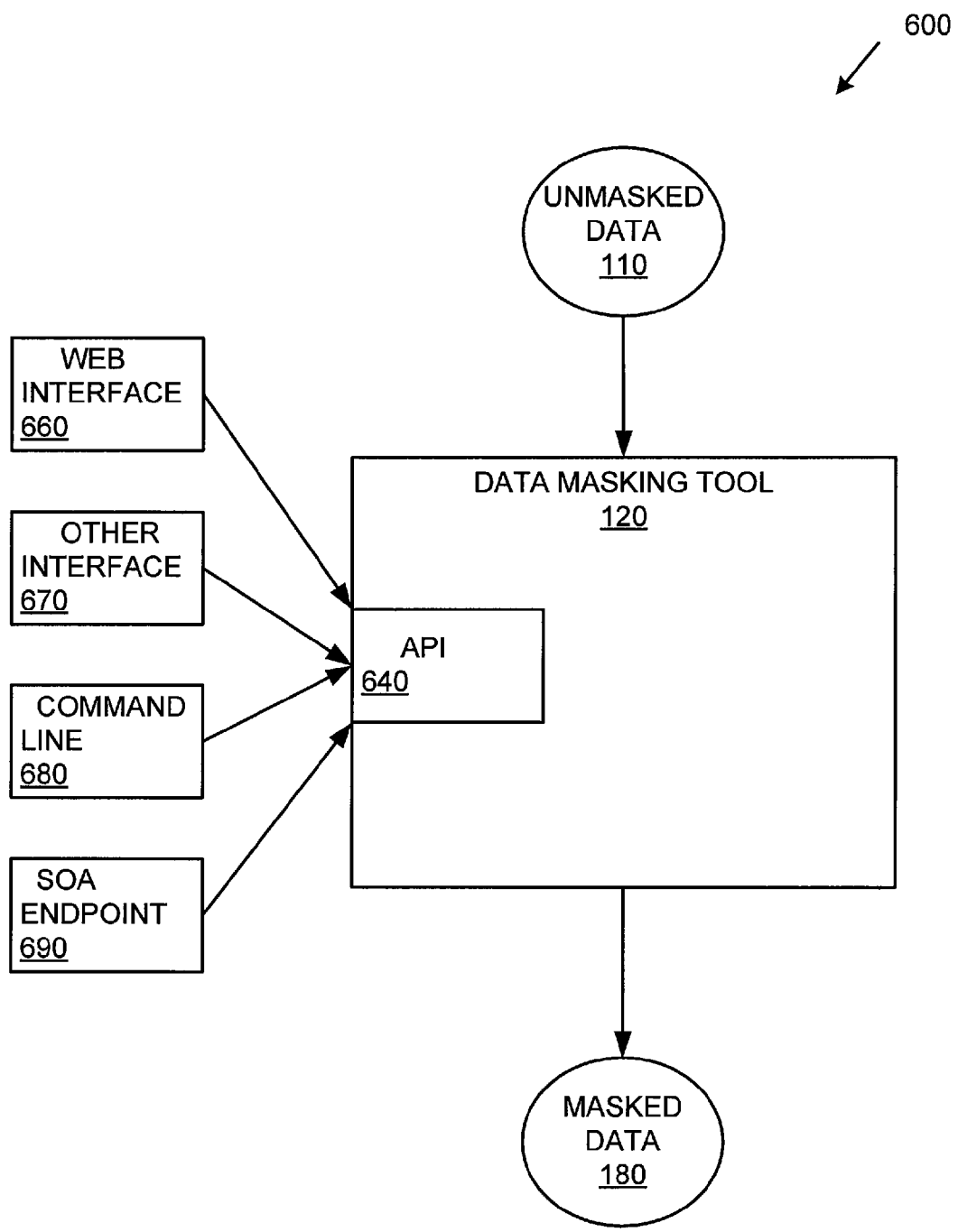
FIG. 6 is a block diagram of an exemplary data masking tool that supports a variety of execution mechanisms.

FIG. 6 is a block diagram of an exemplary data masking tool 600 that supports a variety of execution mechanisms.

In the example, the API 640 can accept calls from a web interface 660. For example, a web interface can present configuration screens by which a user can create configuration data (e.g., a data masking profile) and execute one or more profiles against source data.

The API 640 can also accept calls from other interfaces 670 (e.g., any application that can issue API calls or serve as a hosting application for a data masking tool plug in). For example, it may be desirable for an application to have access to data masking functionality, or a custom front end can be provided.

The API 640 can also accept calls as a result of a command given at a command line 680. For example, a command can be configured to invoke the API 640 with specified configuration data.

The API 640 can also be invoked from a Service Oriented Architecture (SOA) endpoint 690. Thus, data can be masked via the SOA technique (e.g., through a web service without installing the data masking software at a local machine).

EXAMPLE 8

Exemplary External Configuration Tool

Figure 7:
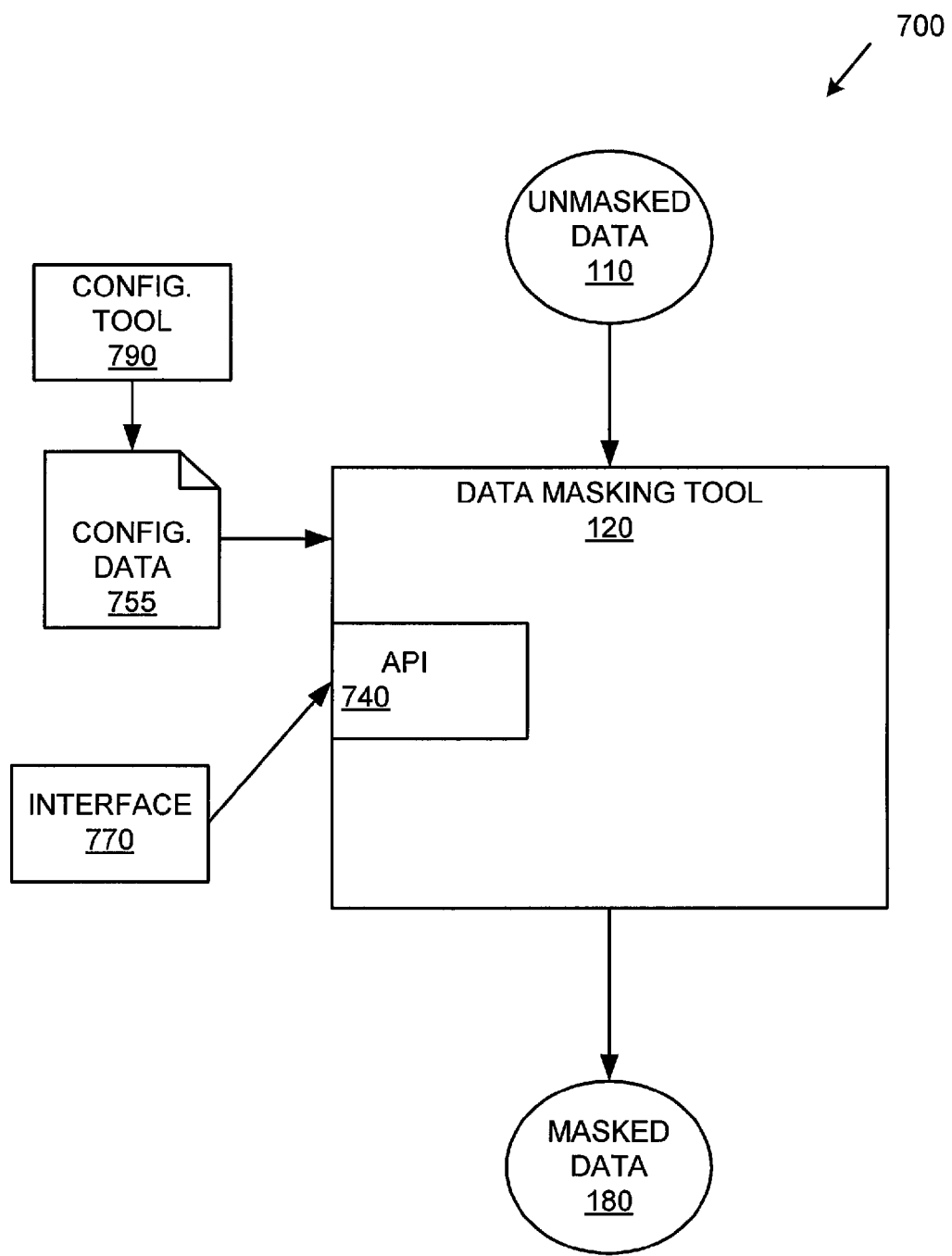
FIG. 7 is a block diagram of an exemplary data masking tool working in concert with an external configuration tool.

FIG. 7 is a block diagram of an exemplary data masking tool 700 working in concert with an external configuration tool 790.

In the example, an interface 770 can invoke the API 740 and specify that the data masking tool 120 apply the configuration data 755.

The configuration data 770 can be generated by an external configuration tool 790.

For example, the data masking tool 120 can be configured to recognize a language (e.g., XML), and the configuration tool 790 can generate configuration data for consumption by the data masking tool 720 in the language.

In this way, a commonly available application (e.g., MICROSOFT EXCEL software) can be used to generate the configuration data 755.

EXAMPLE 9

Exemplary Hosting Application

Figure 8:
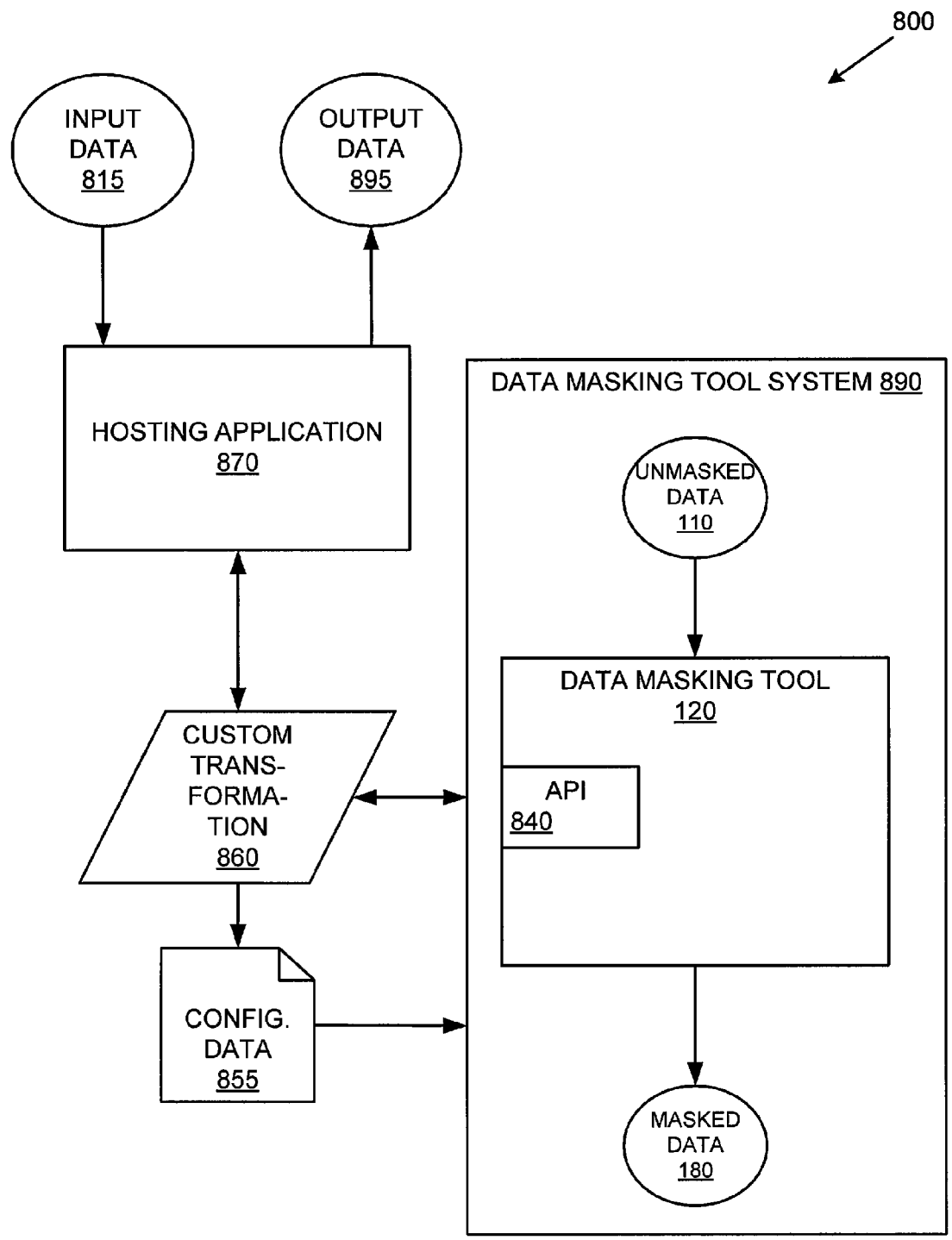
FIG. 8 is a block diagram of an exemplary data masking tool system that is invoked by a custom transformation via a hosting application.

FIG. 8 is a block diagram of an exemplary data masking tool system 890 that is invoked by a custom transformation 860 via a hosting application 870. One example of a hosting application 870 is INFORMATICA software; other software that can support access to a custom transform 860 can be used.

In the example, the hosting application 870 has access to input data 815 and can send the data to the custom transformation 860 to generate appropriate configuration data 855 and invoke the data masking tool 120 (e.g., via API 840) to perform data masking. The custom transformation 860 can provide the unmasked data 810 and retrieve the masked data 880, which is then relayed back to the hosting application 870, which stores it as output data 895.

Such an arrangement can be particularly useful if the hosting application 870 can access data in specialized environments, such as in a mainframe environment. The hosting application 870 can serve as a broker between the specialized environment and the data masking tool 120.

EXAMPLE 10

Exemplary Hosting Application Method

Figure 9:
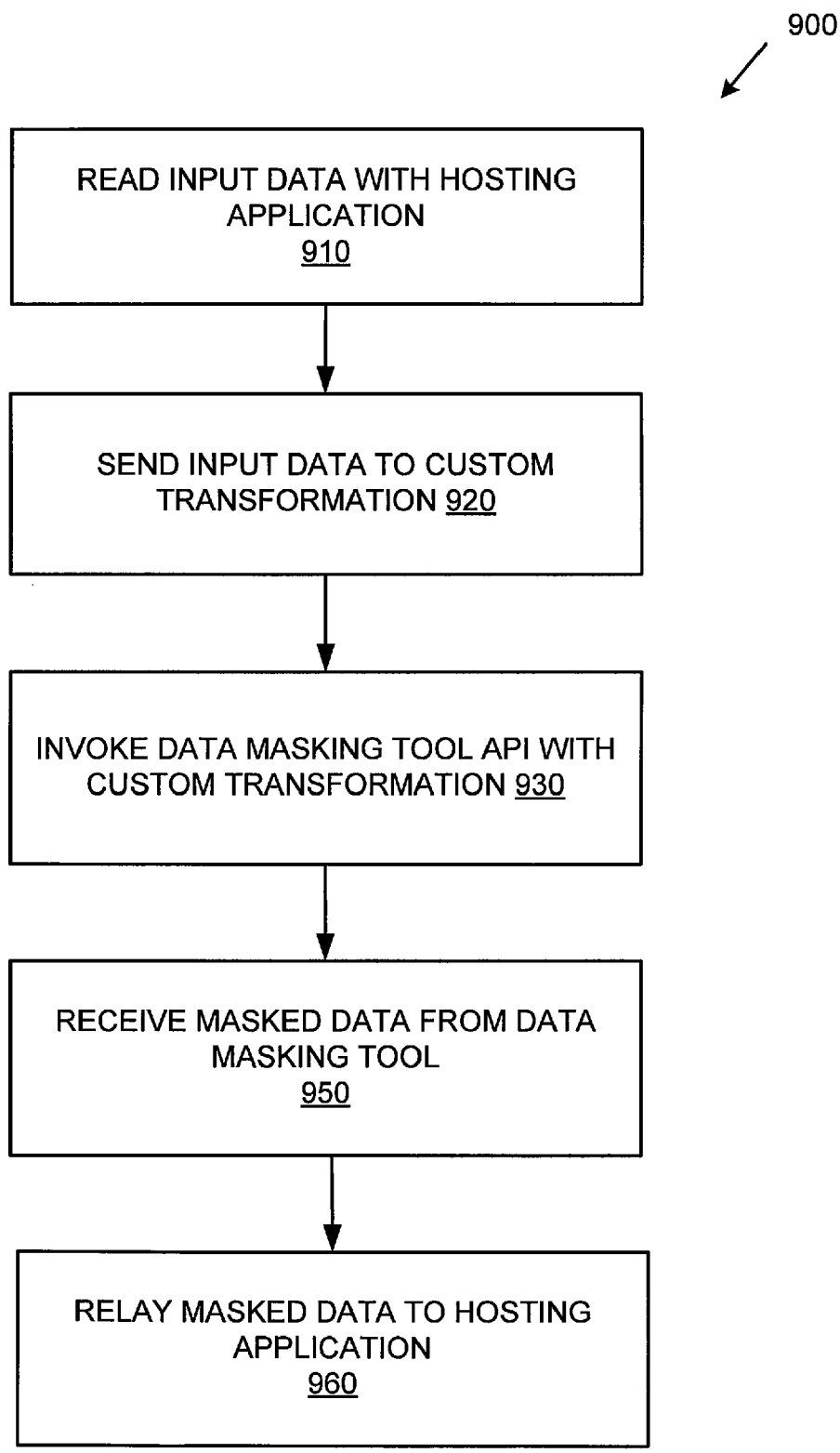
FIG. 9 is a flow chart of an exemplary method of invoking a data masking tool with a custom transformation executed by a hosting application.

FIG. 9 is a flow chart of an exemplary method 900 of invoking a data masking tool with a custom transformation executed by a hosting application.

At 910, input data is read with the hosting application. At 920, the input data is sent to the custom transformation. For example, in a flat file situation, the flat file can be read and then sent to the custom transformation (e.g., the entire file or record by record). Data can be sent via a port arrangement.

At 930, the data masking tool API is invoked with the custom transformation to perform data masking.

At 950, the masked data is received from the data masking tool. For example, the custom transformation can specify a target location at which the tool will place the data.

At 960, the masked data is related to the hosting application. A port arrangement can be used.

EXAMPLE 11

Exemplary Source Data Types

Figure 10:
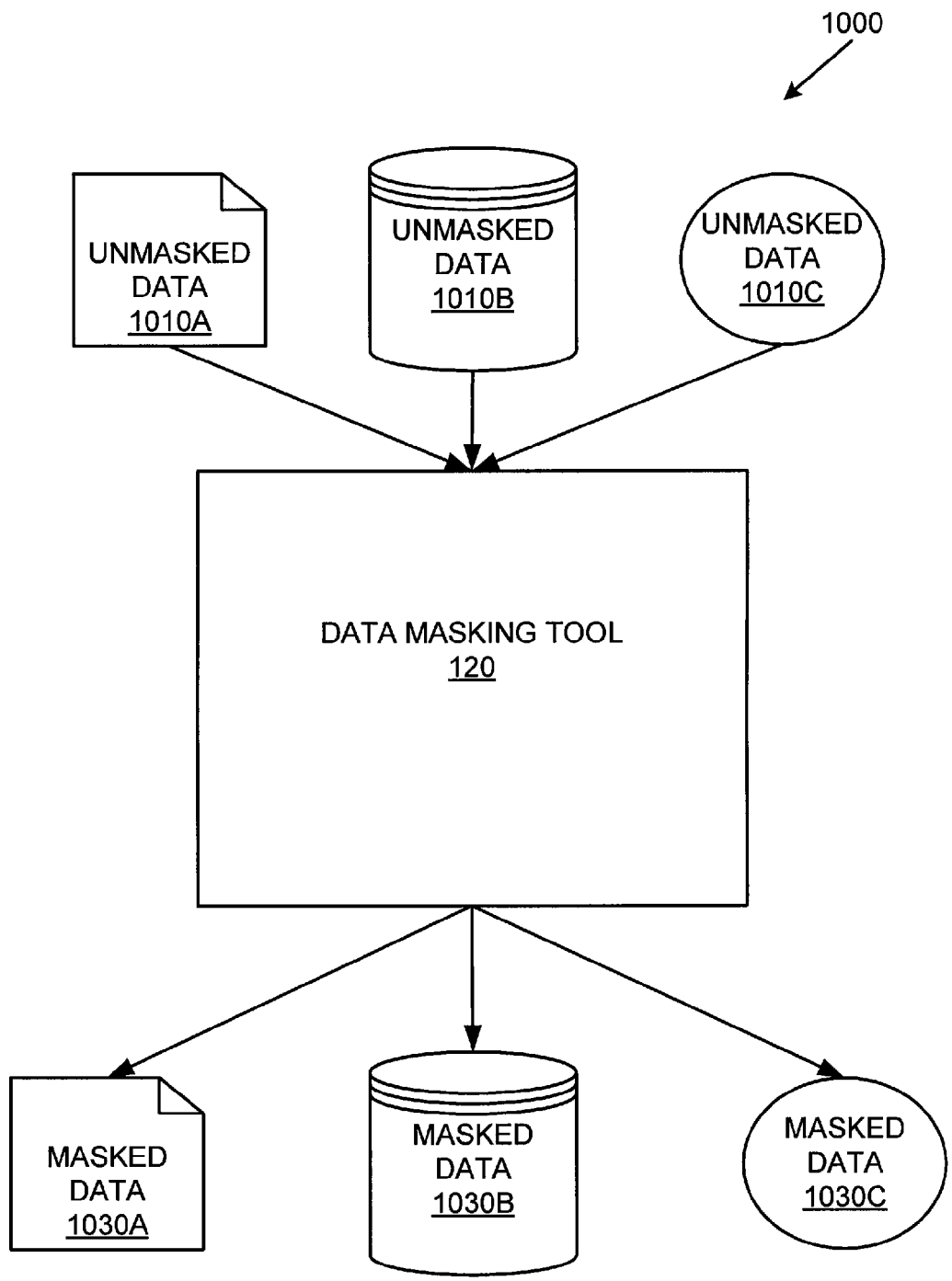
FIG. 10 is a block diagram of an exemplary data masking tool that supports a variety of source data types.

FIG. 10 is a block diagram of an exemplary data masking tool 1000 that supports a variety of source data types.

In any of the examples herein, the data masking tool 120 can support a variety of source data types. For example, unmasked flat file data 1010A, unmasked database data 1010B, and unmasked other data 1010C (e.g., data passed when the data masking tool is a plug in hosted by an application) can be supported.

Similarly, the output (e.g., target) data types can be of different kinds 1030A, 1030B, and 1030C.

If desired, a hybrid approach can be used (e.g., input of one type of data and output of another).

Further, the data sources and data targets can be from different technology platform types (e.g., mainframes, microcomputer-based desktops, UNIX-based systems, and the like). Similarly, a platform-hybrid approach (a data source from one platform type and a data target on another platform type) can be implemented.

EXAMPLE 12

Use with Flat Files

In any of the examples herein, the data masking tool can be used to mask data in flat files. Features to assist in masking can be offered, such as automatically detecting details about the format of a table represented in a flat file. For example, the tool can be configured to read a table in a flat file and determine the number of columns, name of columns (e.g., if stored in the first row of the flat file), data type, size, precision, and the like. The format (e.g., list of column names) of the table in the flat file and the fields therein can be presented to the user for confirmation. Because the column names are listed, the user can easily identify the familiar column names and select masking rules to be applied to the columns based on their respective names.

A graphical user interface presenting the column names can be used to select masking rules for the respective columns as described herein.

EXAMPLE 13

Exemplary Data Masking Profile

Figure 11:
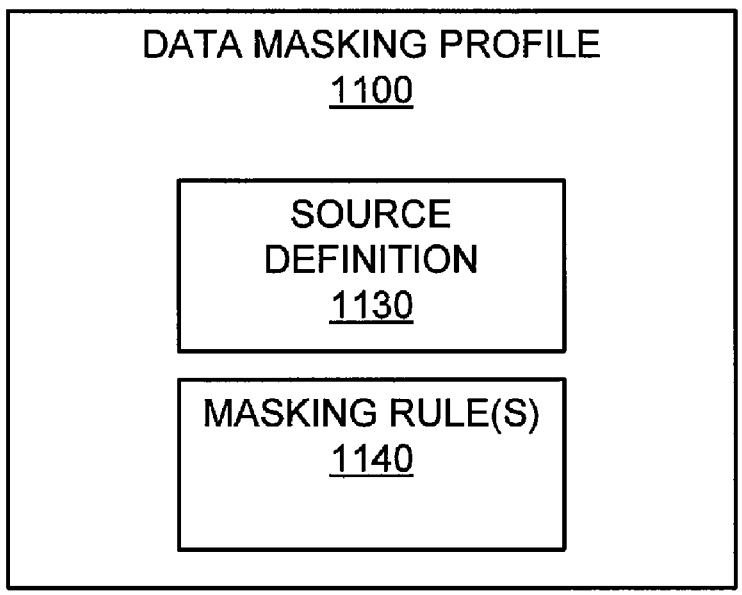
FIG. 11 is a block diagram of an exemplary data masking profile.

FIG. 11 is a block diagram of an exemplary data masking profile 1100.

In the example, the data masking profile 1100 includes a source definition 1130, and one or more masking rules 1140. The source definition 1130 can be stored within the data masking tool for re-use in other profiles.

EXAMPLE 14

Exemplary Executable Data Masking Task

FIG. 12 is a block diagram of an exemplary executable data masking task 1200.

In the example, the executable data masking task 1200 includes one or more names or locations of data masking profiles that are executed when the executable data masking task 1200 is invoked. In this way, more than one profile can be strung together to achieve more complex functionality or to re-use functionality already available.

EXAMPLE 15

Exemplary Interface with Metadata Management Tool

Figure 13:
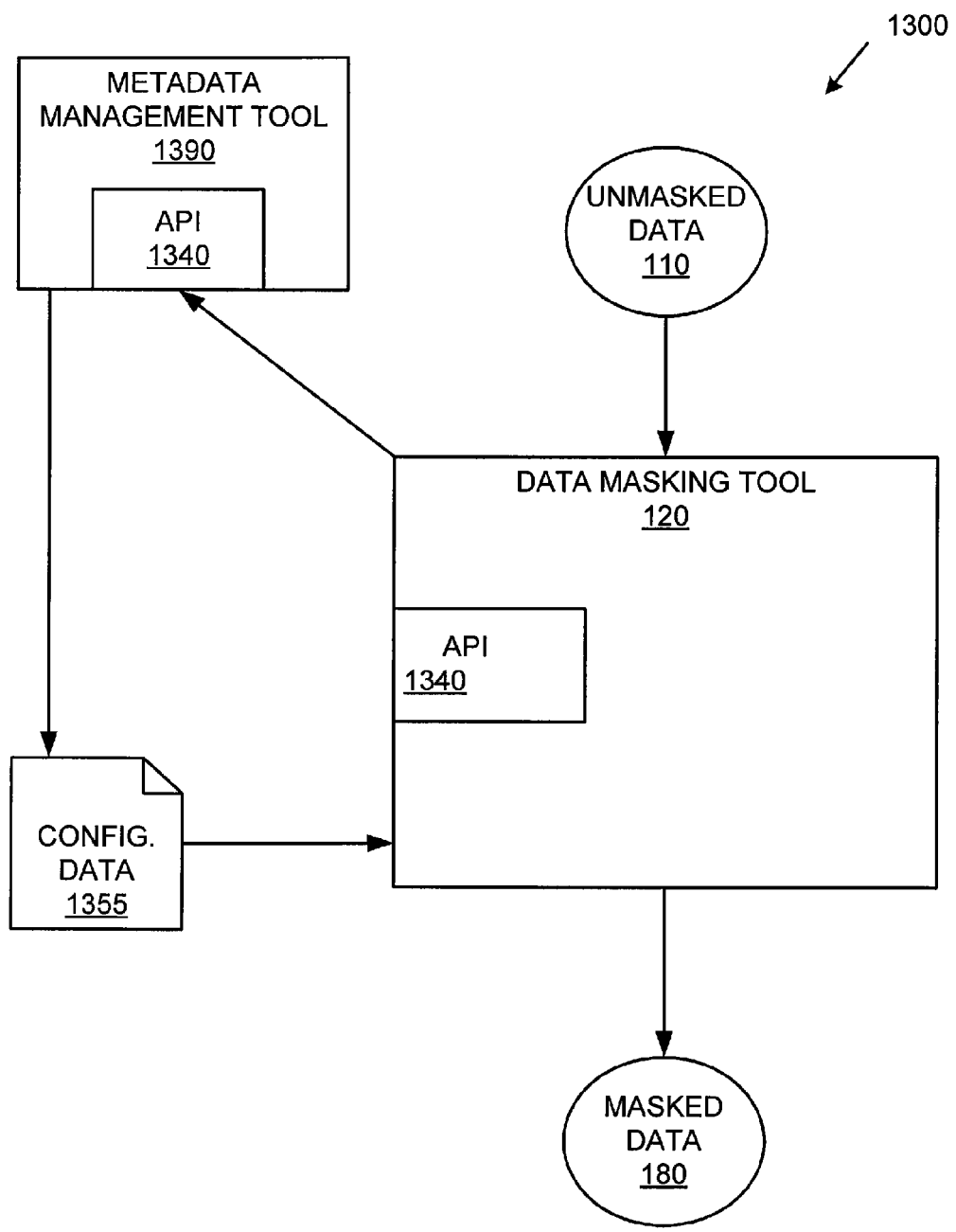
FIG. 13 is a block diagram of an exemplary data masking tool working in concert with a metadata management tool.

FIG. 13 is a block diagram of an exemplary system 1300 in which a data masking tool 120 works in concert with a metadata management tool 1390.

In the example, the data masking tool 120 can contact the metadata management tool 1390 via an application programming interface (API) 1340, which produces metadata regarding the source data 110.

The metadata can include any of a variety of characteristics about the source data 110. For example, if the source data comprises tables, the metadata can indicate column names for tables, data types for the columns, and the like. If multiple tables are represented in the source data 110, the metadata can also indicate table names, relationships between the tables, and the like.

The metadata can be used to generate data masking configuration data 1355. As in any of the examples supporting an API, the API 1340 can be used to invoke the data masking tool, which ultimately outputs the masked data 180.

EXAMPLE 16

Exemplary Method of Interfacing with Metadata Management Tool

Figure 14:
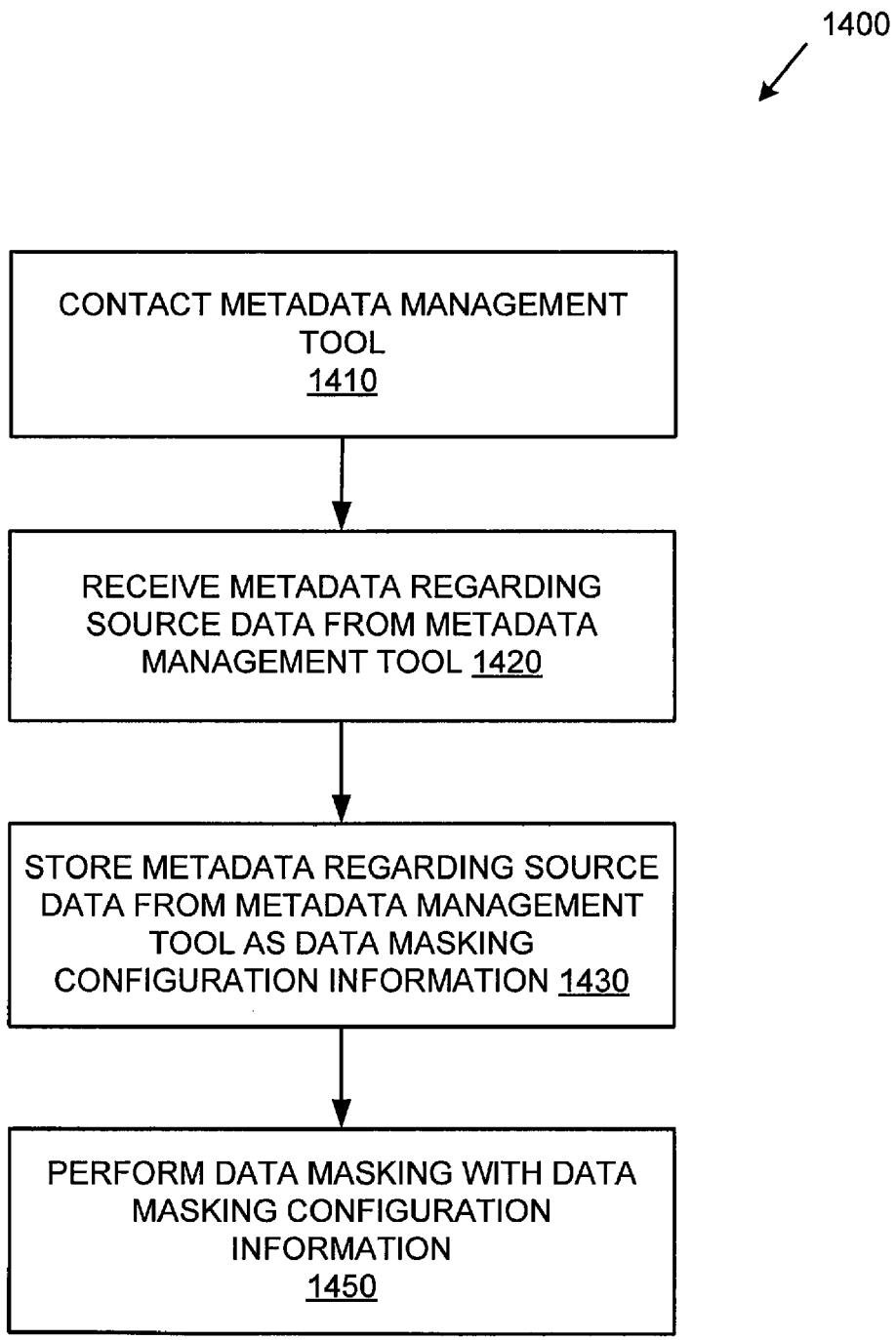
FIG. 14 is a flow chart of an exemplary method of extracting data masking configuration data from a metadata management tool.

FIG. 14 is a flow chart of an exemplary method 1400 of extracting data masking configuration data from a metadata management tool and can be used in any of the examples herein in a system such as that shown in FIG. 13.

At 1410, the data masking tool contacts the metadata management tool.

At 1420, metadata regarding the source data is received from the metadata management tool.

At 1430, metadata regarding the source data is stored as data masking configuration information. For example, if the metadata contains information about tables, columns, column names, data types, and the like, it can be used to generate corresponding data masking configuration information.

If desired, incomplete information can be completed based on partially-populated configuration information. For example, a user can choose the appropriate masking rules to be applied to the respective columns in a table.

However, it is also possible for the metadata management tool to store the masking rules and masking parameters as part of its metadata, leading to a more integrated configuration information management approach.

At 1450, data masking is performed with the data masking configuration information, including that obtained from the metadata management tool.

EXAMPLE 17

Exemplary Architecture: J2EE Application

Figure 15:
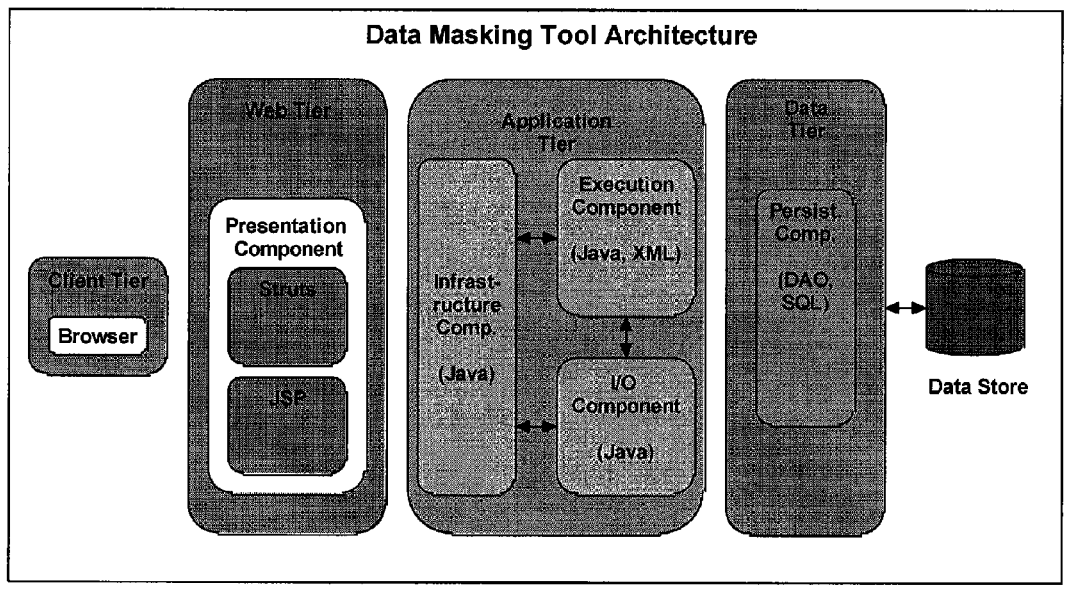
FIG. 15 shows an exemplary architecture for a data masking tool.

FIG. 15 shows an exemplary architecture for a data masking tool. The data masking tool can be developed as a three-tier J2EE application comprising a web application and data tiers. Tiers of the application can have one or more components.

The client tier need not be considered a part of the system because a standard browser can be used. However, it can be considered the client side of the data masking system in some implementations.

The web tier can include the presentation with JSP forming the view and Struts providing the control as depicted in FIG. 15. The web tier can implement the user interface of the tool providing the user with the way to defining/maintaining the various entities like Source Definitions, Profiles, Data Sets, and Executions.

The application tier can include infrastructure, execution, and I/O components to provide execution control, logic implementation, and file system access respectively as depicted in the diagram.

The I/O Component can perform the task of reading the input source data, passing it to the execution component, and subsequently receiving the masked output data from the execution component.

The Execution Component can include the data masking logic and algorithms. The component can perform the following: applying the rules defined in the profile to the input dataset (e.g., source data) received from the I/O component; returning the masked output dataset (e.g., target data) to the I/O component; and composing the execution details into XML format. The execution component can be self-sufficient and expose an interface that can be invoked from other applications.

The Infrastructure Component can be used for functions like logging, error handling, and the like.

The Data tier implements access to the mapping rules persisted in the data store. The persistence component can encapsulate the database interaction logic and be accessed by the web component and the execution component.

EXAMPLE 18

Another Exemplary Architecture

Figure 16:
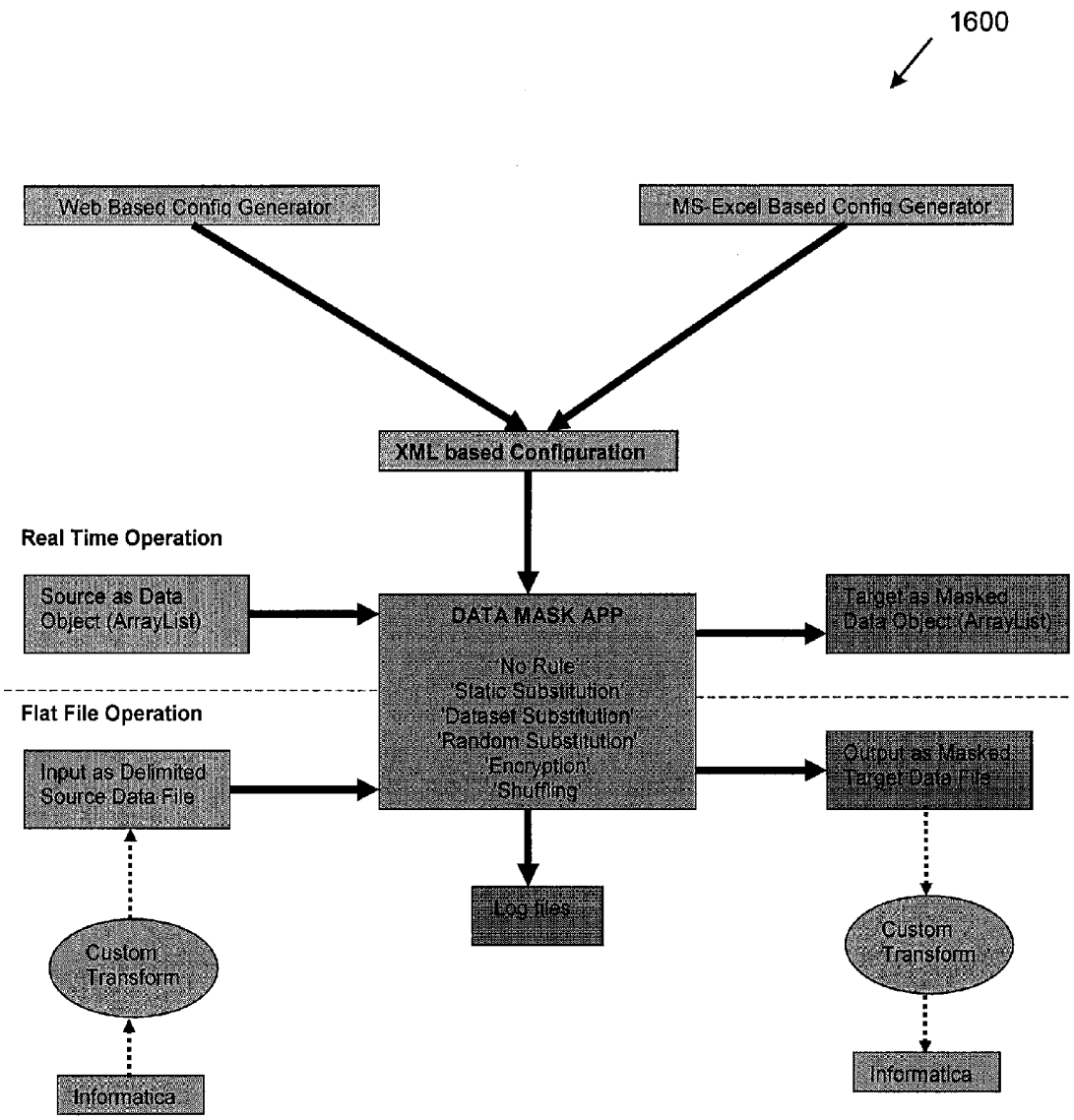
FIG. 16 shows another exemplary architecture for a data masking tool.

FIG. 16 shows another exemplary architecture for a data masking tool.

EXAMPLE 19

Exemplary Connectivity

Figure 17:
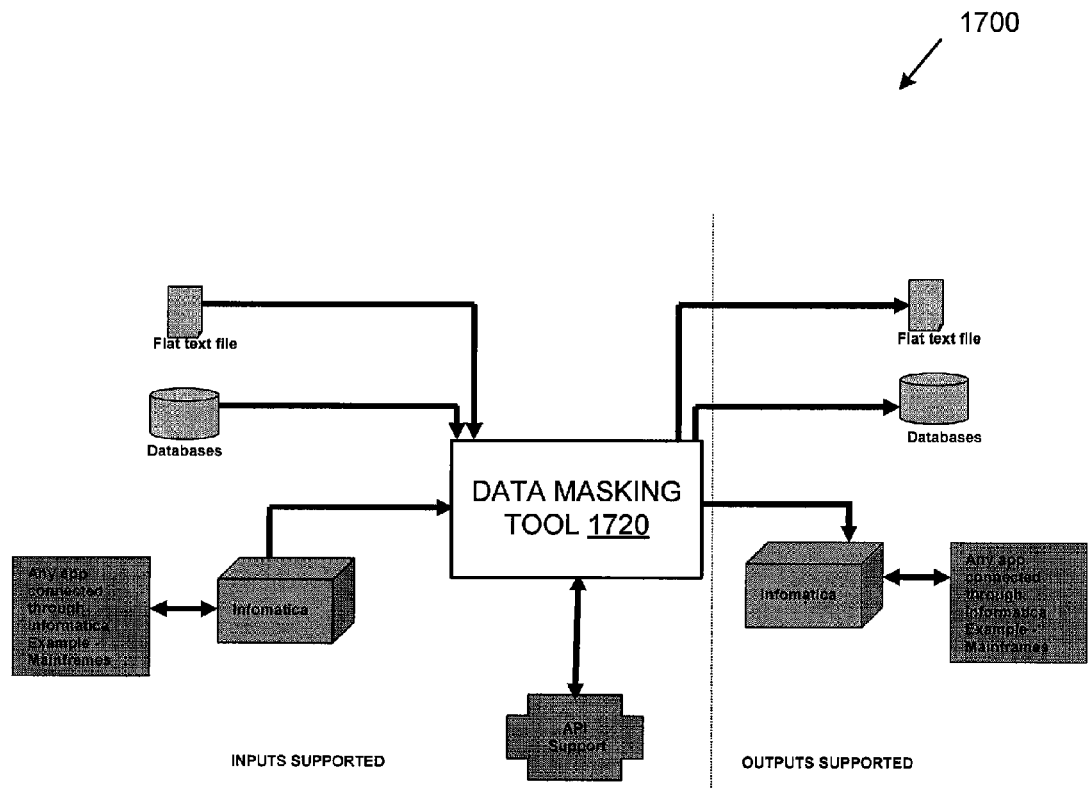
FIG. 17 shows exemplary connectivity for a data masking tool.

FIG. 17 shows exemplary connectivity for a data masking tool.

EXAMPLE 20

Exemplary Web Interface

FIGS. 18-29 are screen shots of a web interface for driving a data masking tool and can be used in any of the examples herein.

Figure 18:
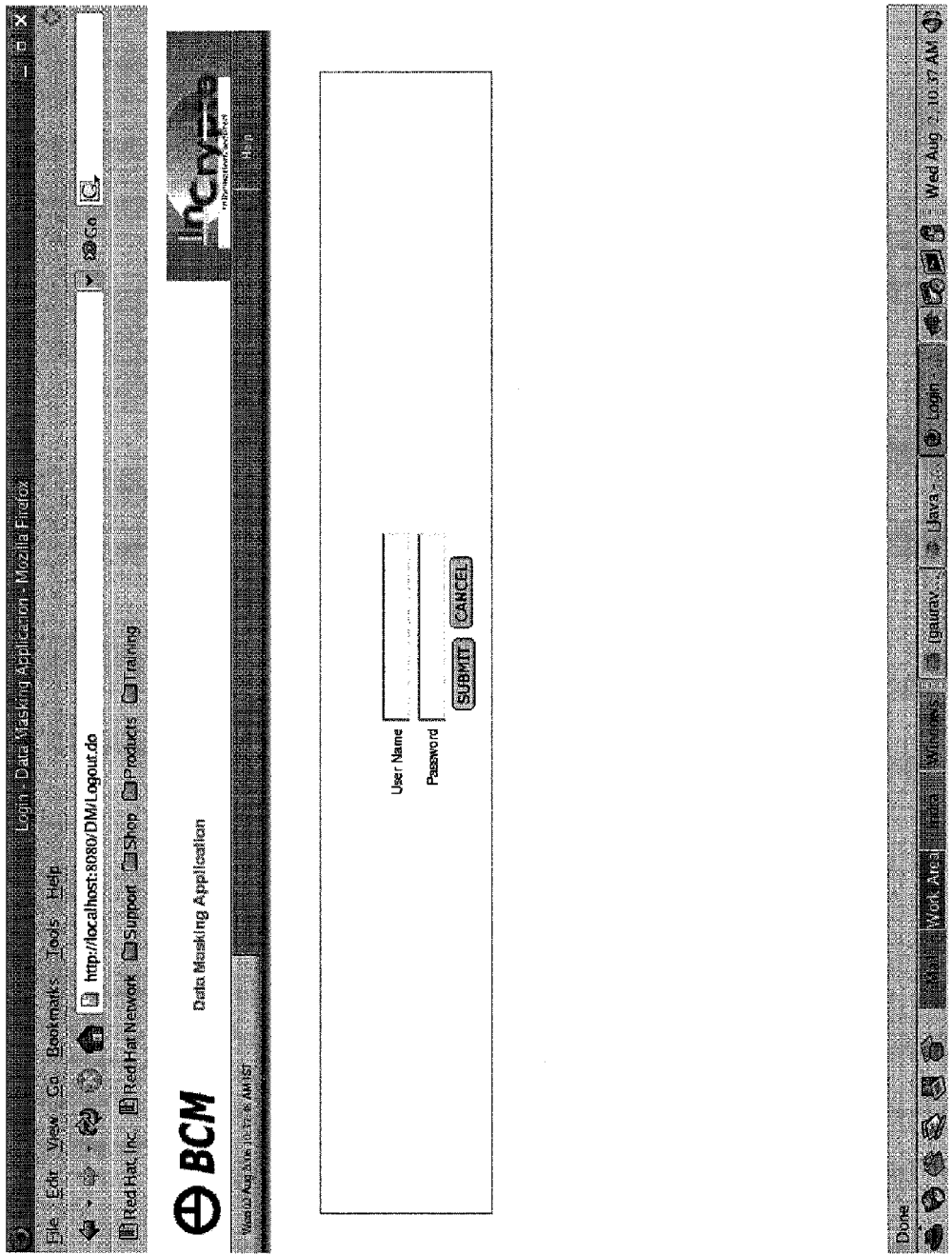

FIG. 18 shows a login screen. The user can login to the tool using a valid login id and password. Clicking on "Submit" starts the tool.

Figure 19:
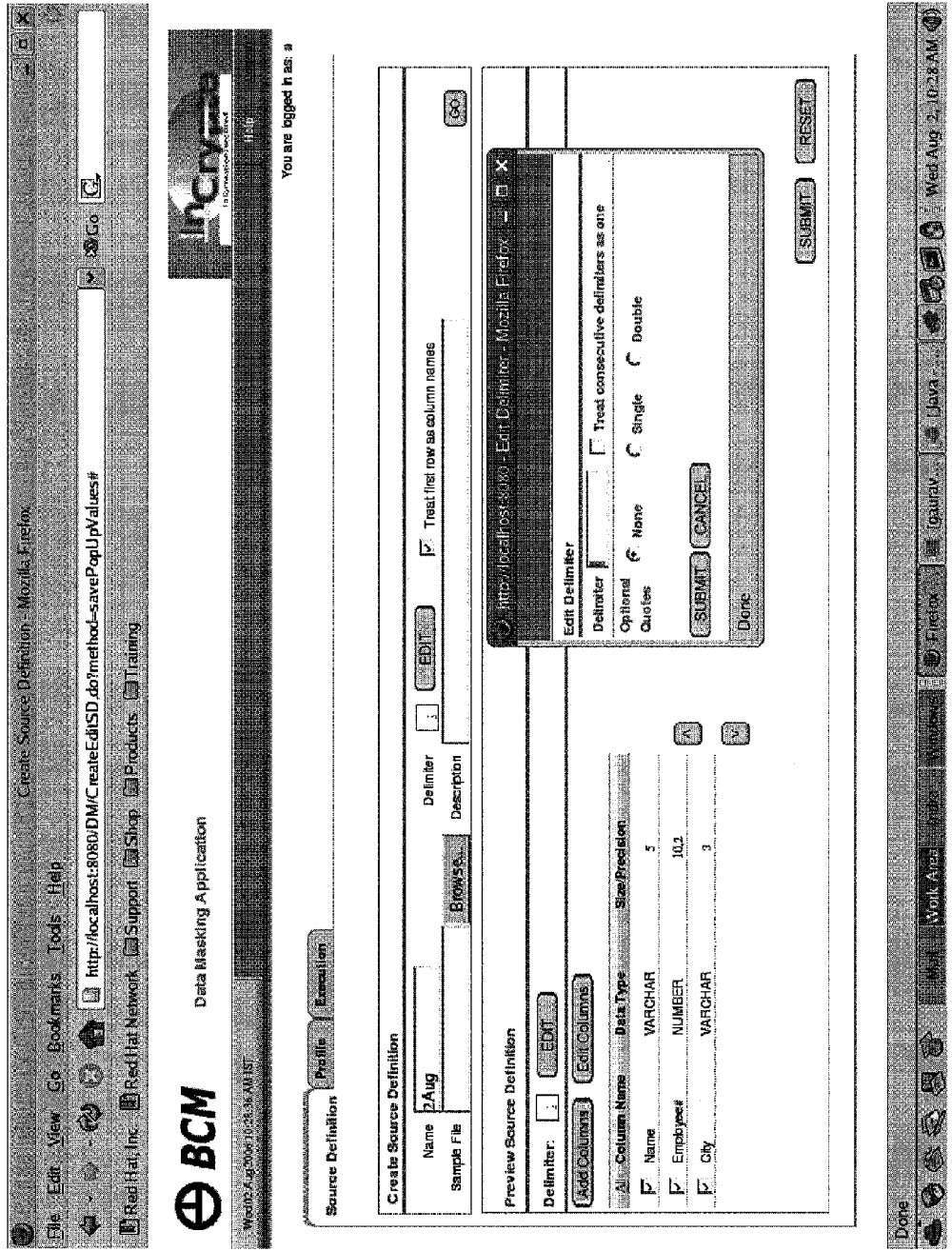

FIG. 19 shows a screen for creating a source definition. The user provides details about the source text file (e.g., the location, the delimiter used in the file, and the like).

After the information about the source text file is available to the tool, the tool can fetch the metadata from the file (e.g., the number of columns, name of columns, their data type, size or precision, and the like), and displays it to the user.

Figure 20:
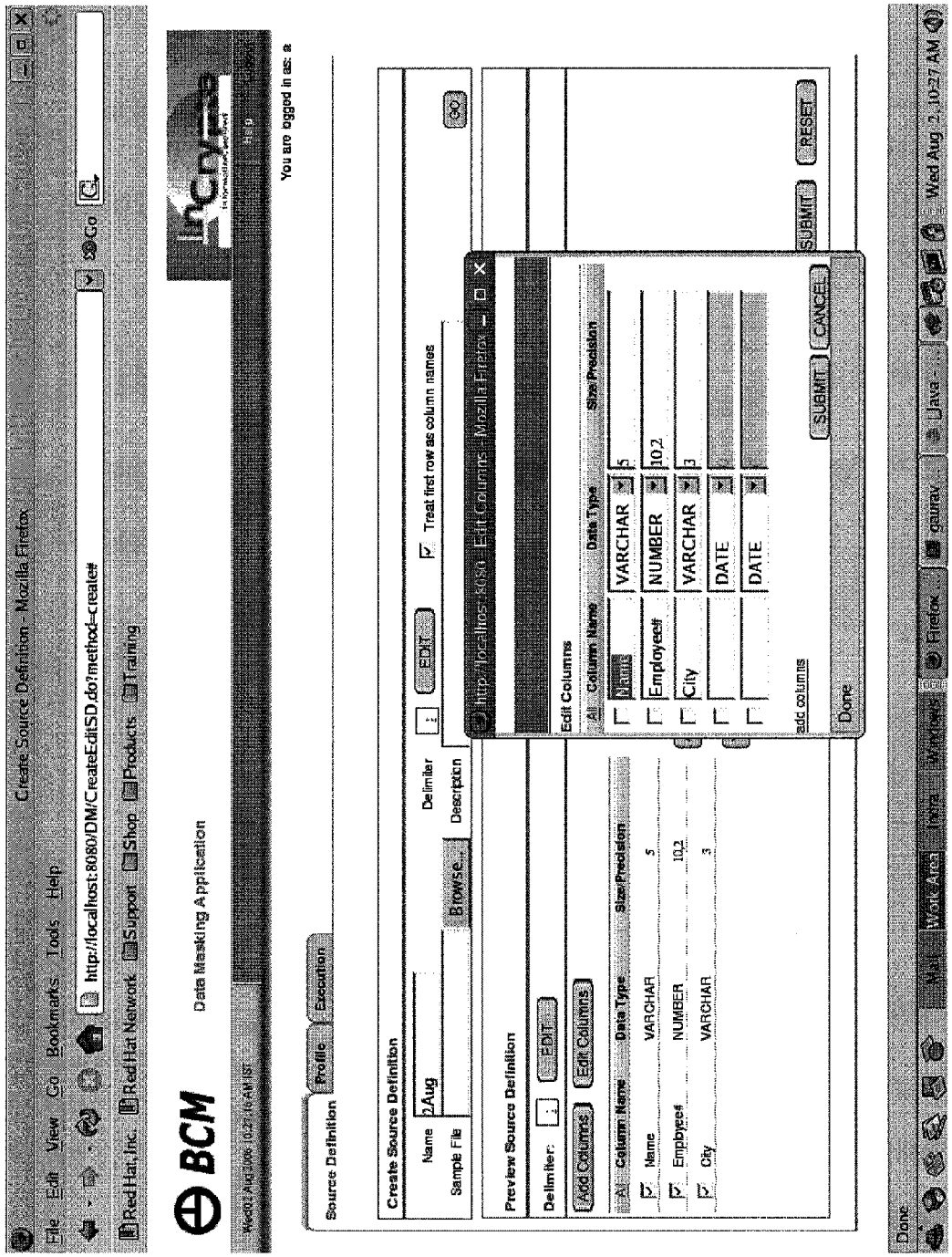

FIG. 20 shows a screen for editing a source definition. The user can edit the text file details by clicking on the "Edit" button. A user can add a new column, delete an existing column, alter the data type and size of the column, and the like.

Figure 21:
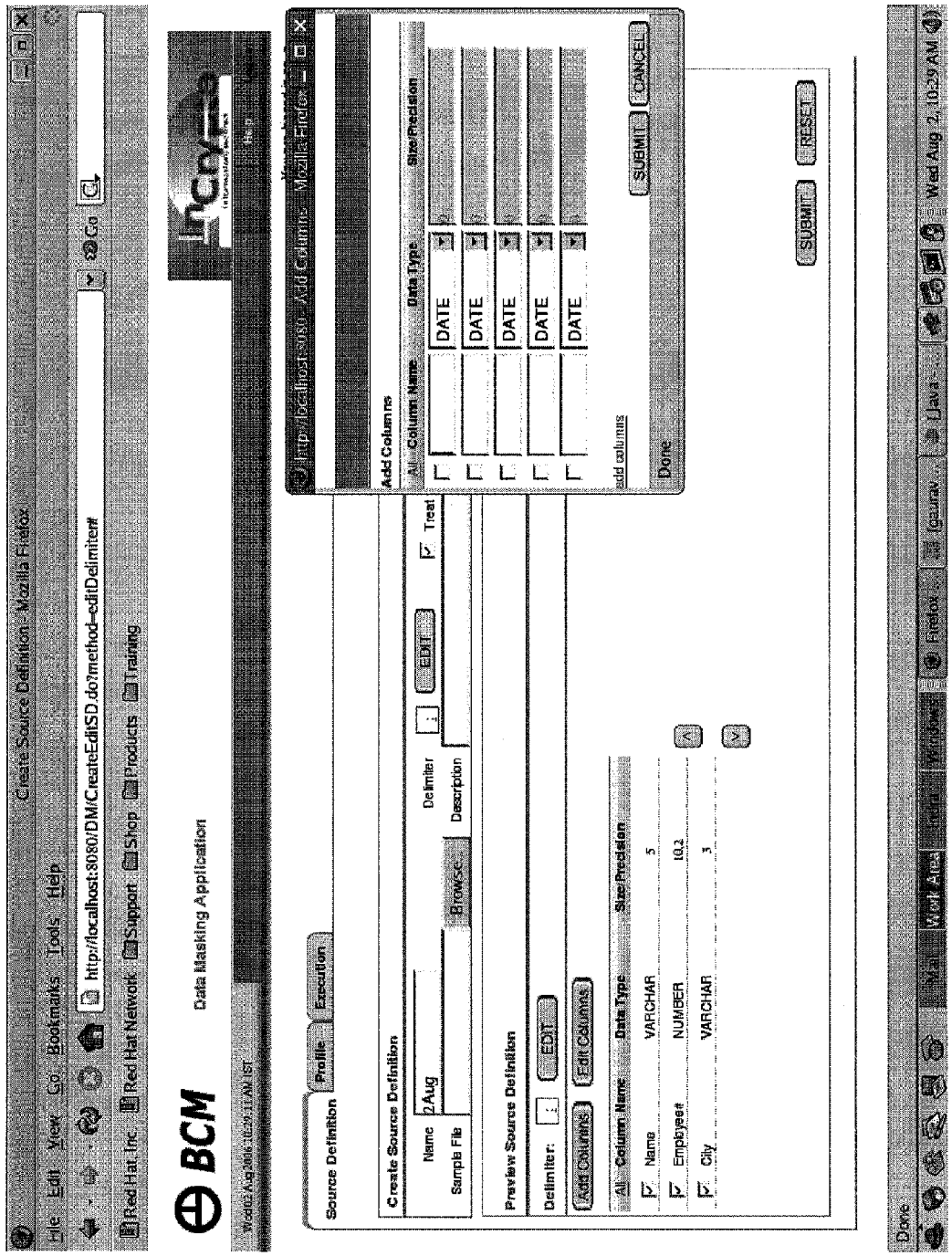

FIG. 21 shows a screen for adding a new column to the source definition. A user can add new columns to the text file. The user can use the option when the text file does not have its first row as column names. The user can add column names and give the data type and precision of the column.

By default, the tool treats the first row of data in the text file as the column names.

Figure 22:
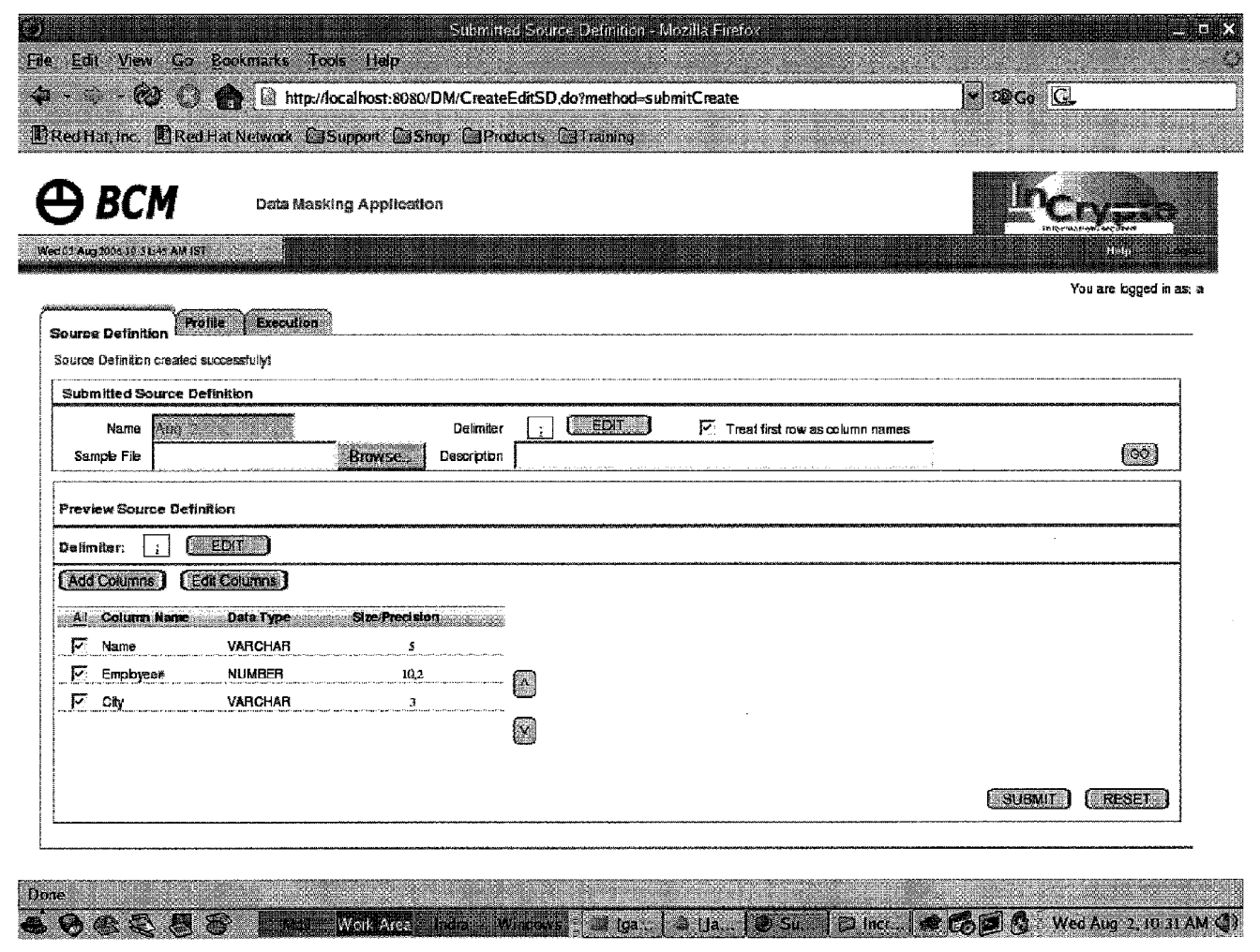

FIG. 22 shows a screen for creating the source definition. The user can create the source definition (e.g., metadata about the source text file) by clicking on the "Submit" button.

The tool can display whether the creation was successful or a failure on the screen.

Figure 23:
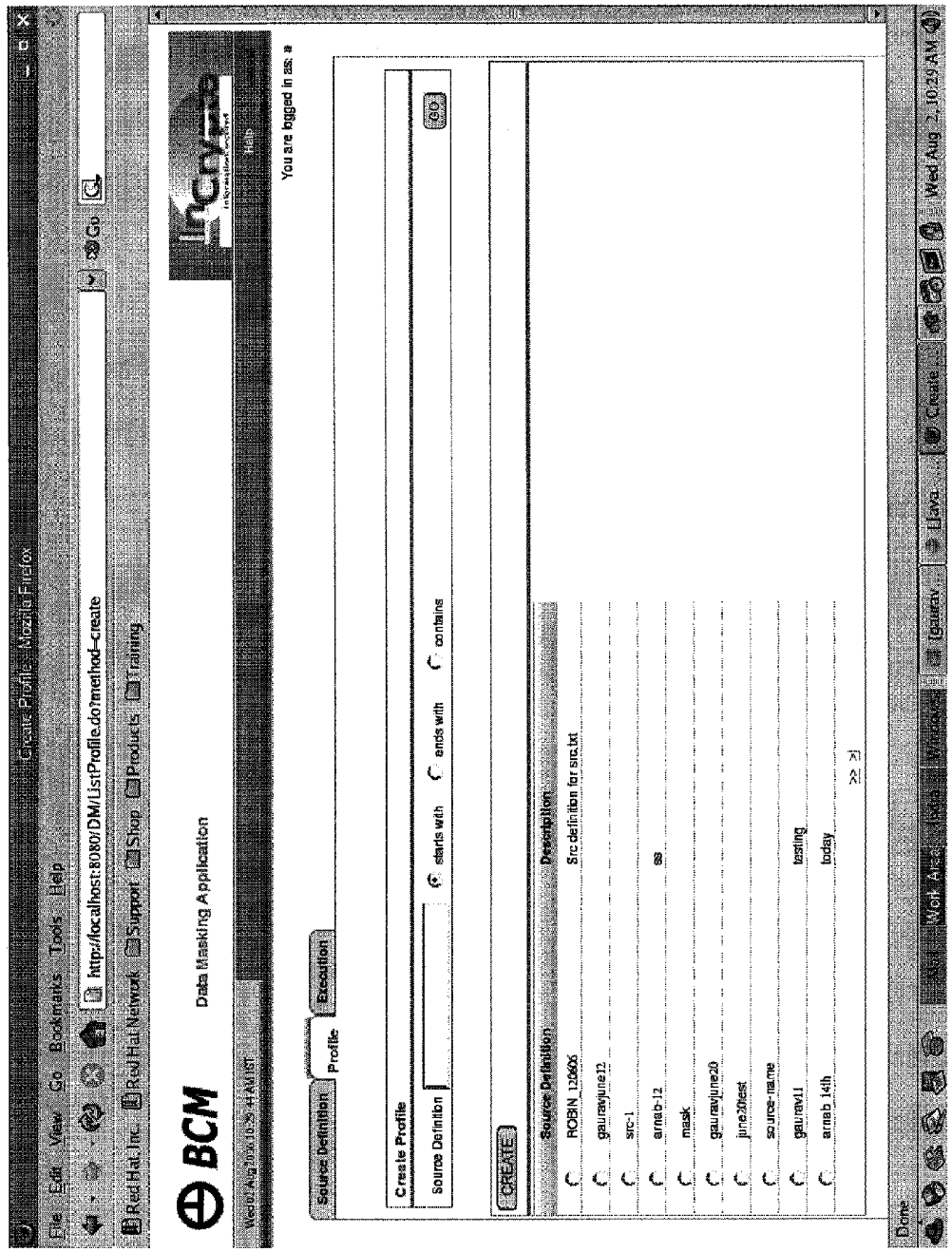

FIG. 23 shows a screen for entering information for a data masking profile. The user can provide the information about the masking rules that are to be applied to the source data file. The user can select the relevant source definition from the list of source definitions provided by the tool (e.g., such as one created by a user using the previous screens).

Figure 24:
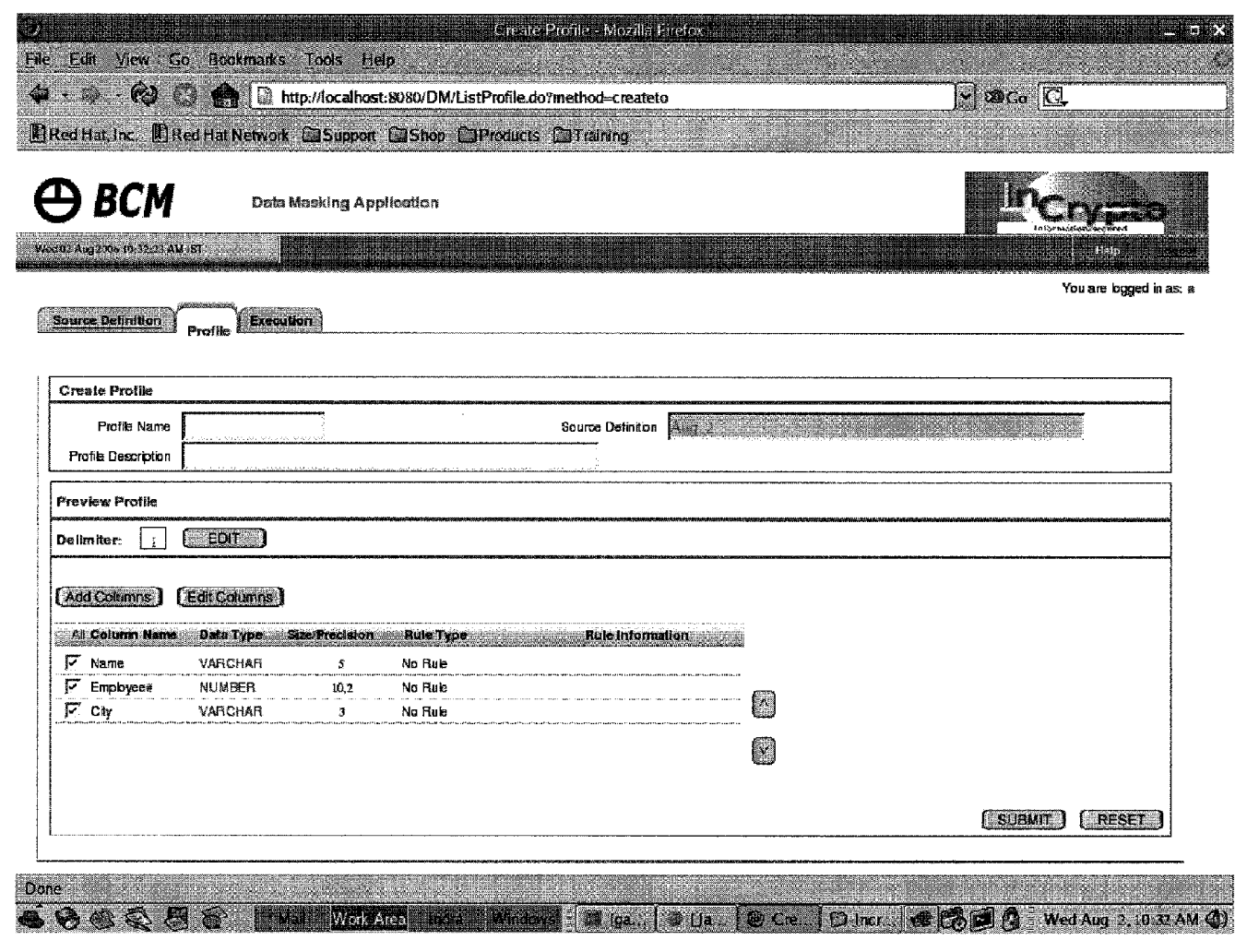

FIG. 24 shows a screen for creating the new data masking profile. The user can give a name to the profile to be created. In order to create the profile, the user can give the masking rule information by clicking on the "Edit" button.

Figure 25:
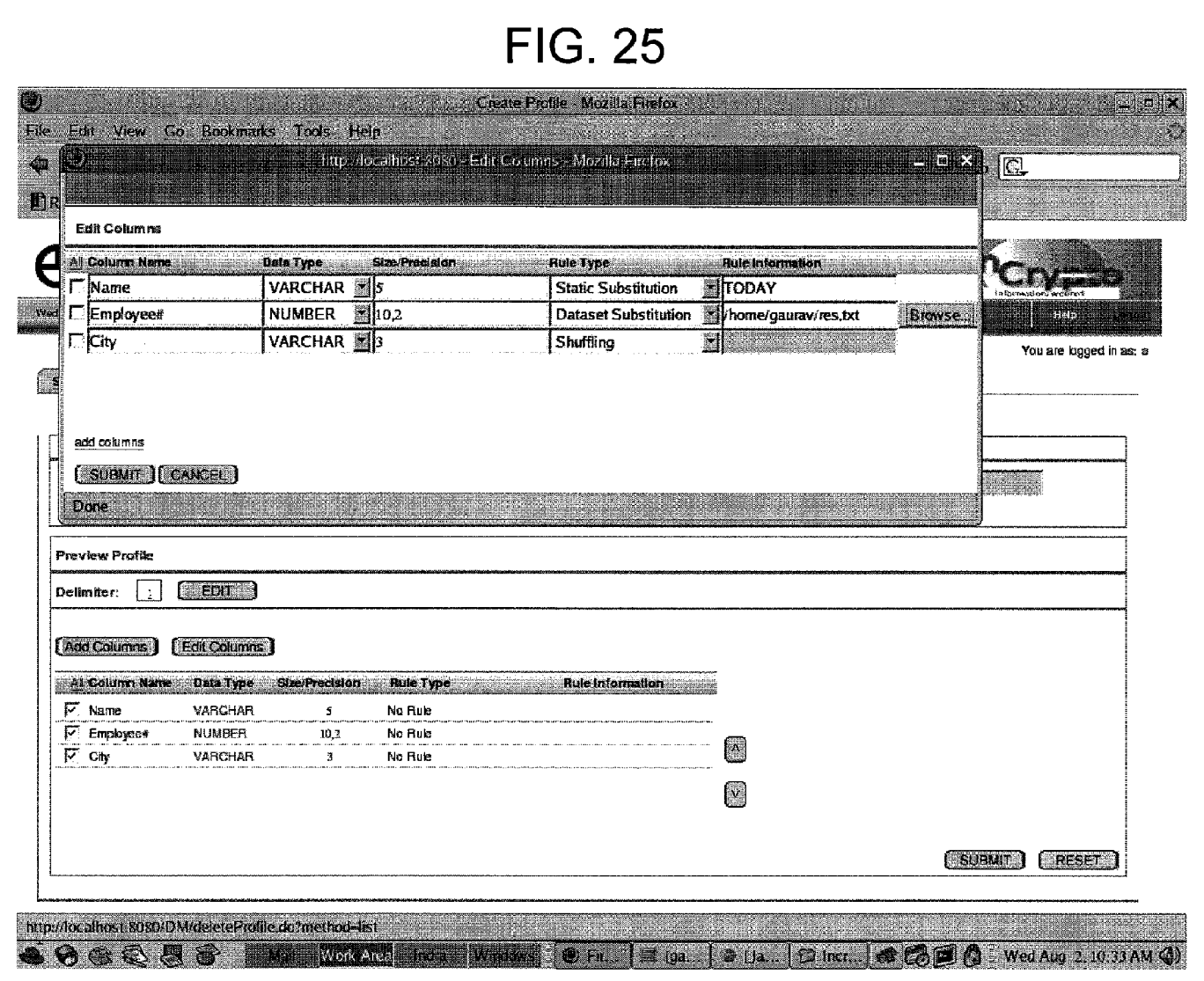

FIG. 25 shows a screen for providing masking information. The tool can display the column details in the source file to the user with an option of choosing a masking rule from the drop down list.

After the user selects the masking rules for the columns, the information can be submitted with the "Submit" button.

Figure 26:

FIG. 26 shows a screen by which the profile is created. The user can create the new profile by clicking on the "Submit" button. The tool can display whether the creation was successful or a failure on the screen.

Figure 27:
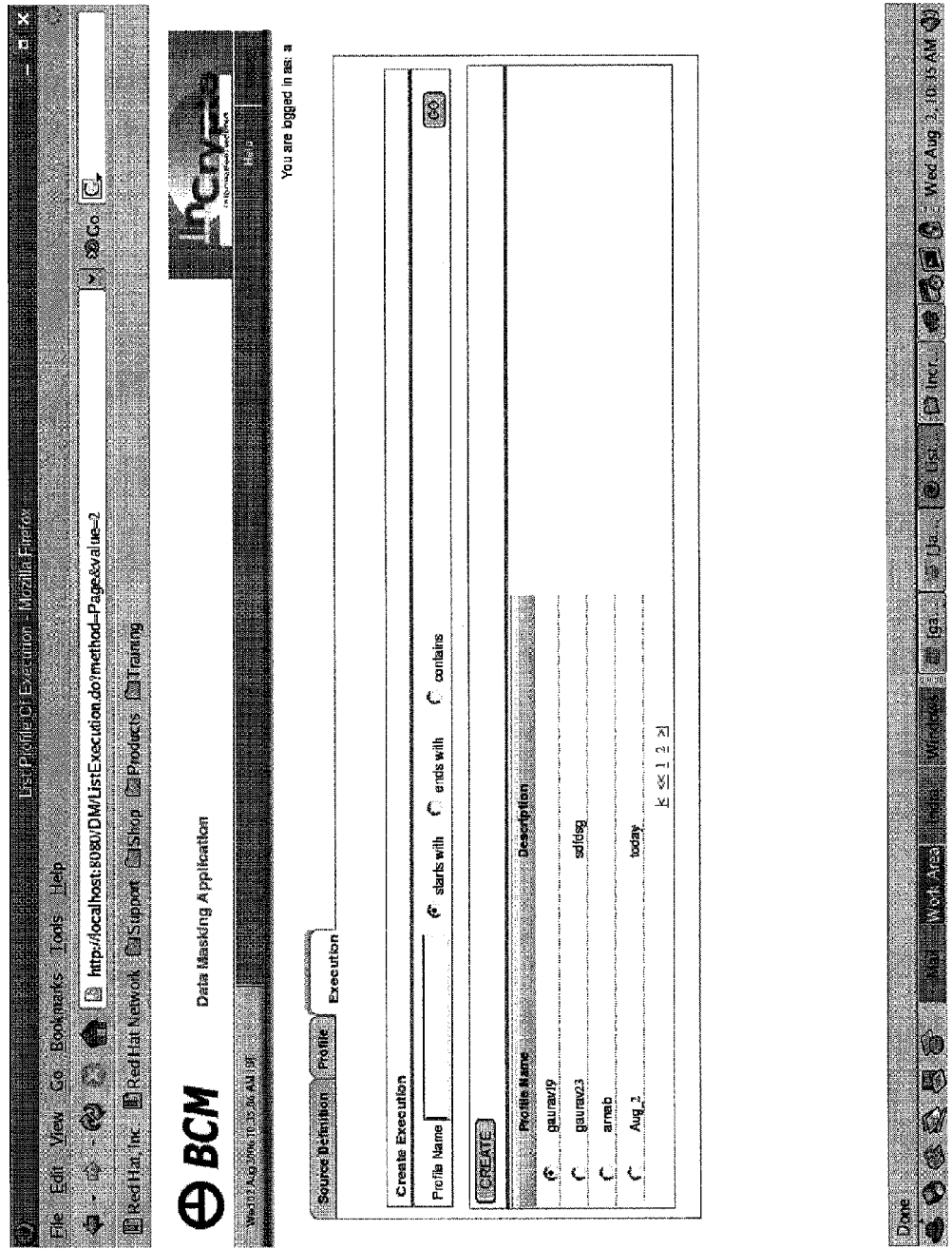

FIG. 27 shows a screen for defining an executable data masking task (or "execution"). The tool executes the rules on the source data file and creates a masked data file based on information provided by the user.

Figure 28:
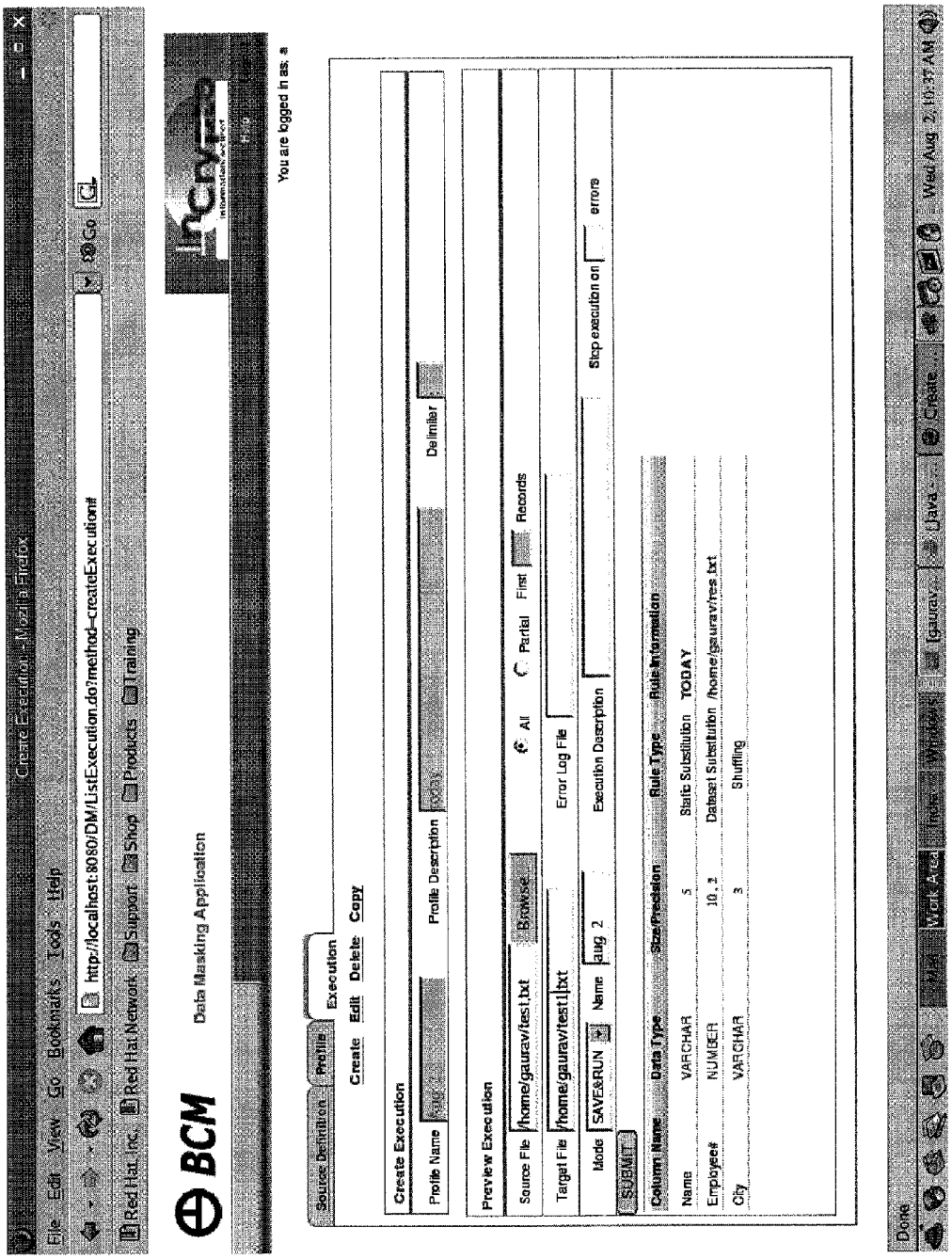

FIG. 28 shows a screen for creating the executable data masking task. The user creates the task by selecting the profile created and giving the location of the source data file. The user can also give a name to the task for the tool to save the details in a database for later use.

Figure 29:
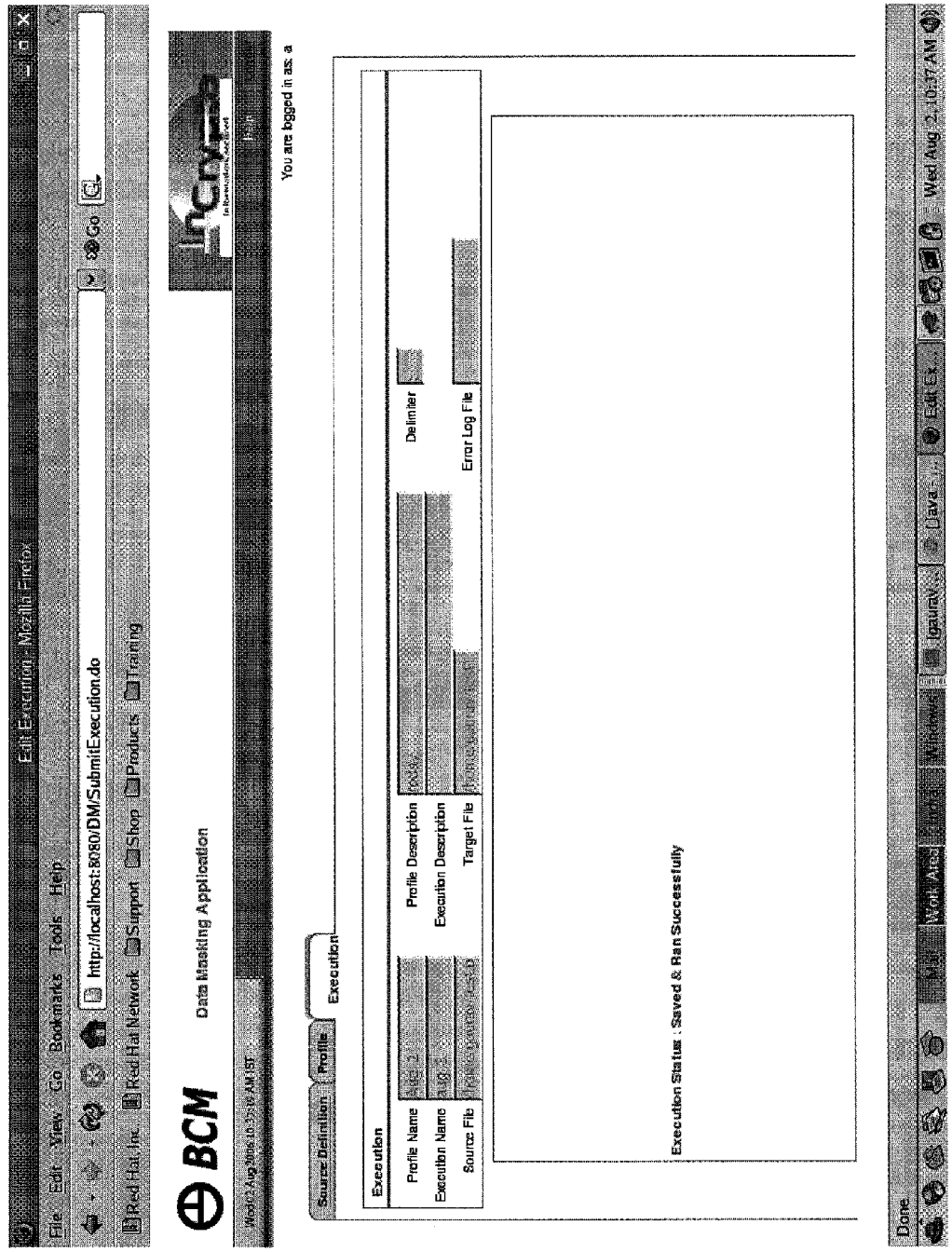

FIG. 29 shows a screen for running a task. The user can run the task by submitting the task details. The tool can apply the rules provided in the profile by the user and create a masked data file.

EXAMPLE 21

Exemplary Spreadsheet-based Configuration of Data Masking Tool

Figure 30:
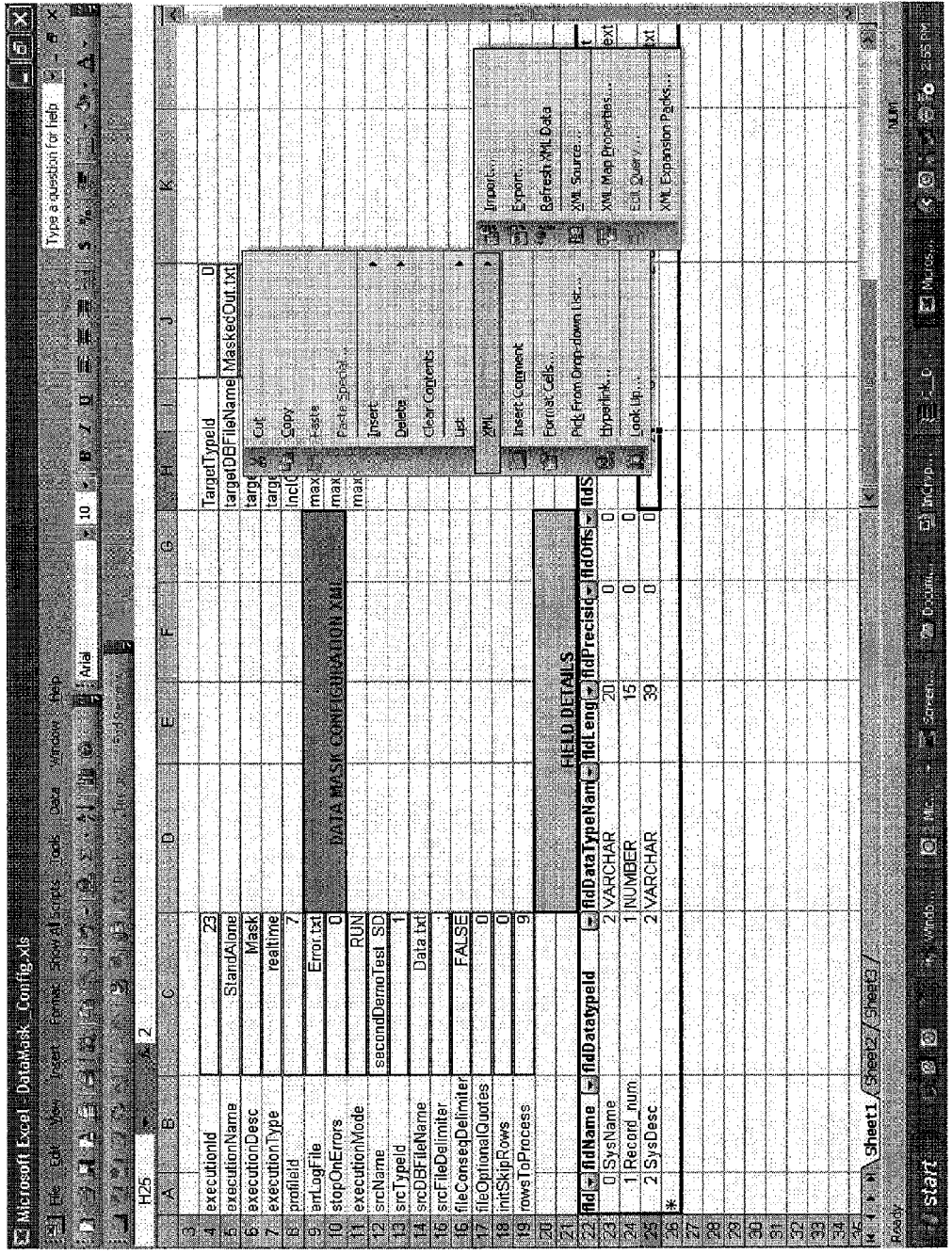
FIG. 30 shows a spreadsheet-based configuration of a data masking tool.

FIG. 30 shows an example of spreadsheet-based configuration for the data masking tool. The user can provide the metadata about the source data file in a spreadsheet. A template can be provided into which the user enters appropriate data.

The tool can read the spreadsheet and create XML from it. The tool or a separate tool can read the XML to file the source of the data (e.g., real time data or from a text file).

If real time data is indicated, then the tool acts on the data using the masking rules provided by the user in the spreadsheet. If the source is a text file, then the tool acts on the data in the text file, masking it based on the user information in the spreadsheet.

The tool can easily be extended to any data source because the tool can use a spreadsheet to obtain the metadata about the source.

EXAMPLE 22

Exemplary XML Tag Definitions

The following tags can be defined when representing data masking configuration information in extensible markup language. In any of the examples herein, corresponding data masking configuration information can be stored and implemented by the data masking tool.

| | |
|---|---|
| executionName | Name of the Execution. Any name can be given for a particular execution. If a standalone run is required, then the value of this element doesn't have any significance. |
| executionDesc | Name of the Execution description. A meaningful description for a particular execution should be given. If a standalone run is required, then the value of this element doesn't have any significance. |
| executionType | This depicts if the data mask application operates on real time objects or on flat file. The valid values are 'realtime' and 'flatfile'. |
| profileId | Profile Id. This field was introduced to distinguish between different profiles created through the web component, and this id was unique for a particular profile. If a standalone run is required, then the value of this element doesn't have any significance. |
| errLogFile | Fully qualified path of the error log file. |
| stopOnErrors | A number which can be used to stop the processing if the number of erroneous records in the source file equals this number. If this value is set to 0 the process will not stop for any number of read or processing errors. If this value is set to 1 or more the process will abort when the set number of errors occur. |
| executionMode | Either of the three execution modes can be there 1). SAVE 2). RUN 3). SAVE&RUN. If a standalone run is required, then the value of this element doesn't have any significance. |
| srcName | Fully qualified path of the Source file which contains the records to be masked. |
| srcTypeId | This field signifies the source type. Defaults to flat file. When the tool integrates with other types of sources (e.g., databases or MQ), other values are used. |
| srcTypeName | This field signifies the association of the source name for the source type id |
| srcDBFileName | This field contains the location of the source file including the complete path. |

-continued

| | |
|---|---|
| srcFileDelimiter | The delimiter which is used to separate the different column values in the source file. |
| fileConseqDelimiter | Either true or false. This field is set to true when two consecutive delimiters need to be treated as one delimiter. |
| fileOptionalQuotes | For a delimited file there is a possibility that the delimiter can also be a part of the data in a column. In such a case the field can be enclosed in quotes to indicate that the delimiter too is a part of the column text. |
| fileEscapeCharacter | Escape Character |
| initSkipRows | Initial number of rows to be skipped from the source file for data masking. |
| rowsToProcess | Number of rows to be processed in the source file for data masking. |

For fields (e.g., columns), the following can be used:

| | |
|---|---|
| fldId | An id assigned to the field, this can start from the value 0, the next field with a field id 1 and so on. There should be at least one field/column, and there can be a maximum of any number of fields/columns. |
| fldName | The name of the field/column. |
| fldDatatypeId | The data type id of the field/column. This field was introduced to assign an id for the different datatypes of the field/column while creating a profile through the web component and this id can have values - (1). 1 for the datatype 'NUMBER' (2) 2 for the datatype'VARCHAR' (3) 3 for the datatype 'DATE'. If a standalone run is required, then the value of this element doesn't have any significance. |
| fldDataTypeName | The data type name of the field/column. Either of the three values (1) NUMBER (2) VARCHAR (3)DATE. If a standalone run is required, then the value of this element doesn't have any significance. |
| fldLength | The length of the field/column. |
| fldPrecision | Precision in case of a decimal number. |
| fldOffset | This field was added to take care of fixed with files for the case of delimited files this value can be null. This field indicates the starting byte location for respective fields. |
| fldSeqNo | The sequence number of the field/column appearing in the source file. This should start from 0 and so on. |

For data masking rules, the following can be used:

| | |
|---|---|
| ruleId | An id assigned to the rule; will have the value 0 if there can only be one rule per field/column. |
| ruleTypeId | Since there are 5 different rules by which data can be masked, an id is assigned to each of these rules. This field was introduced to assign an id for the rules to be applied on the field/column while creating a profile though the web component and this id can hold these values - (1). 0 for 'No Rule' (2) 1 for 'Static Substitution' (3) 2 for 'Dataset Substitution' (4) 3 for 'Random Substitution' (5) 4 for 'Encryption' (6) 5 for 'Shuffling' |
| ruleTypeName | The rule type name to be applied on a particular field/column. Either of these values - (1) No Rule (2) Static Substitution (3) Dataset Substitution (4) Random Substitution (5) Encryption (6) Shuffling |
| ruleText | The entry made here has different interpretation for different rules. (1). For 'No Rule' - No need to specify any value (2). For 'Static Substitution' - The text which needs to be substituted to the field/column (3). For 'Data Set Substitution' - Fully qualified path of the data set file (4). For 'Random Substitution' - formatted string specifying number, characters, case, and the like (5). For 'Encryption' - No need to specify any value (6). For 'Shuffling' - No need to specify any value. |
| ruleDatasetId | A value of 0 can be specified. If a standalone run is required then the value of this element doesn't have any significance. |
| ruleDatasetPath | An entry should be made in this element only if the rule type is 'Dataset Substitution'. The value entered is the fully qualified path of the data set file. |

-continued

| | |
|---|---|
| ruleDataType | A value of 0 can be specified. If a standalone run is required then the value of this element doesn't have any significance. |
| ruleMethodOfGen | An entry should be made in this element only if the rule type is 'Random substitution'. This field can hold values - (1) 1 for 'FormattedText' (2) 11 for 'RandomFloat' (3) 12 for 'Sequential Float' (4) 13 for 'Random Integer' (5) 14 for 'Sequential Integer' (6) 21 for 'Random Date' (7) 22 for Sequential Date. |
| ruleFormat | An entry should be made in this field only if 'Formatted text' sub rule type is chosen under 'Random Substitution'. |
| ruleLwrLimit | The lower limit to be entered in case of 'Random Substitution' |
| ruleUprLimit | The Upper limit to be entered in case of 'Random Substitution |
| ruleIncrValue | The increment value to be entered in case of 'Random Substitution |
| upperCase | Uppercase |

Further possible tags are as follows:

| | |
|---|---|
| targetTypeId | A value of 0 can be specified. If a standalone run is required then the value of this element doesn't have any significance. |
| targetTypeName | The data type of the target (e.g., flat file or the like) |
| targetDBFileName | Fully qualified path of the Target file where the masked records will be written. |
| targetFileDelimiter | The delimiter which is used to separate the different column values in the target file. |
| targetFileOptionalQuotes | For a delimited file there is a possiblility that the delimiter can also be a part of the data in a column. In such a case the field can be enclosed in quotes to indicate that the delimiter too is a part of the column text. |
| targetFileEscapeChar | Escape character |
| InclColNames | Whether to include field/column names in the target file or not. A value of true or false can be entered here. |
| maxSrcBuffer | This field signifies in bytes the block size in which to read the source file. The number of records to be read is calculated by dividing the maxSrcBuffer/maxRecLen |
| maxDSBuffer | This field signifies in bytes the block size in which to read the dataset file. The number of records to be read is calculated by dividing the maxDSBuffer/maxRecLen |
| maxRecLen | The maximum number of bytes in a record |

EXAMPLE 23

Exemplary Data Masking Rules

FIGS. 31A-C and FIGS. 32A-B show exemplary data masking rules.

Static substitution is shown in FIG. 31A. A column is replaced with a static values for all the rows in the Name field. For example, all names can be replaced with "ZZZ ZZZZZ."

Dataset substitution is shown in FIG. 31B. A column is replaced with a value from a pre-defined dataset. For example, the names dataset can be used to replace all the rows in the Name column.

Random substitution is shown in FIG. 31C. A column is replaced with a random value within a range such that the value is random (e.g., replace a data with a random date between a range).

Encryption is shown in FIG. 32A. The data in a column is encrypted using a secure encryption algorithm (e.g., replace the Name column with an encrypted string).

Shuffling is shown in FIG. 32B. The column values of a dataset are shuffled like a pack of cards (e.g., the column Name is shuffled without changing the SSN column).

EXAMPLE 24

Exemplary Implementation of Custom Transform for Hosting Application

FIGS. 33-39 show exemplary screen shots for implementing a custom transform for a hosting application that invokes a data masking tool.

In the example, a Java custom transform is used in INFORMATICA software. A data masking tool can take advantage of the PowerMart and PowerCenter features of INFORMATICA software to allow access to and from a wide variety of data sources and formats.

A package containing a component (e.g., "pcjava.dll" and "pcjava2.jar") can be installed by which the custom transform can be implemented.

Figure 33:
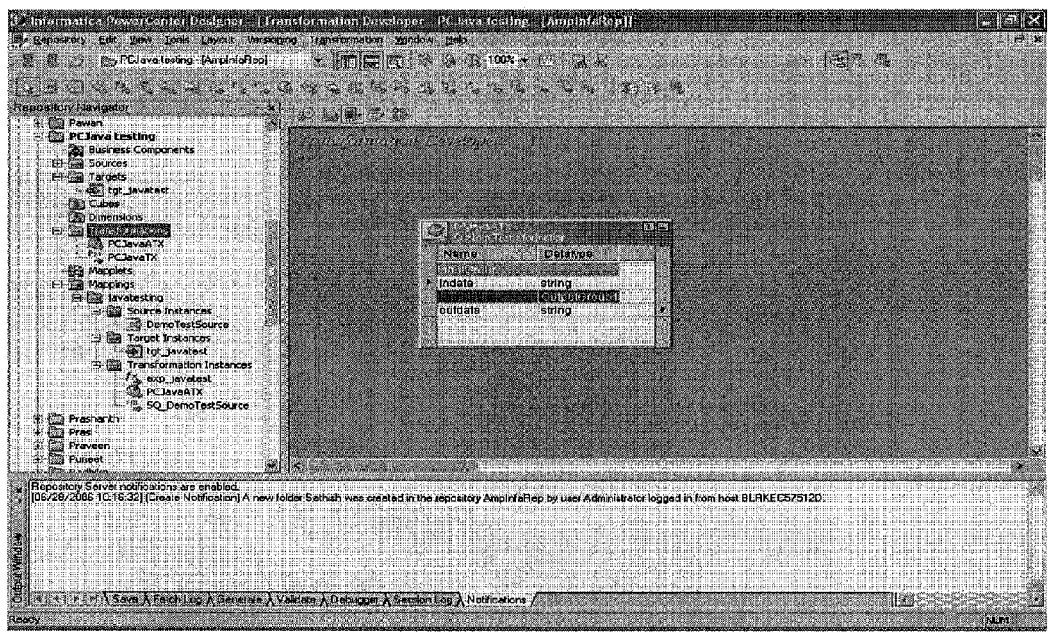
FIGS. 33, 34, 35, 36, 37, 38, and 39 show exemplary screen shots for implementing a custom transform for a hosting application that invokes a data masking tool.

The PowerCenter Designer can be started, and an external object from the package pcjava.xml can be imported. The Transformation Developer can be opened, and a new Advanced External Transformation (ATX) can be created as shown in FIG. 33.

Figure 34:
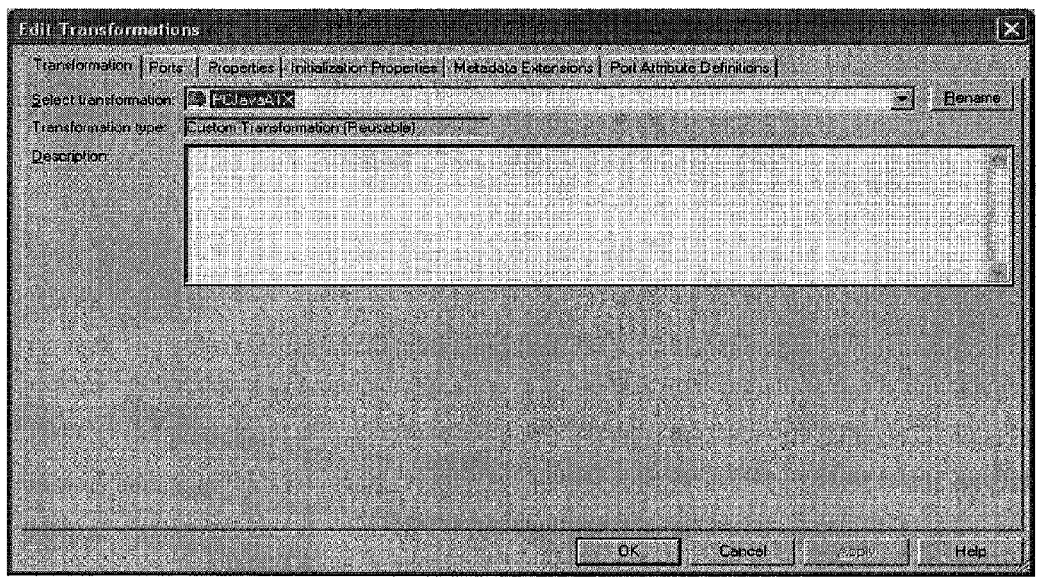

The properties can be edited by double clicking the ATX as shown in FIG. 34.

Figure 35:
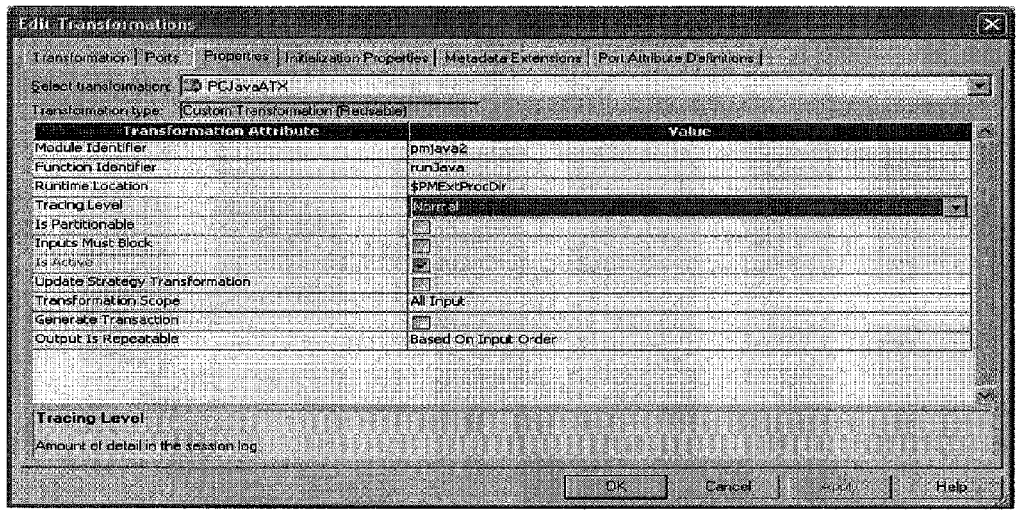

The ATX can be renamed to describe the custom transform. The ports section can be left as it is (e.g., empty) for now, and proceed to the Properties section as shown in FIG. 35. The ATX can be configured as shown. Note that if the pmjava2.dll is installed in any other directory than the ExtProc directory of the PowerCenter server, the Runtime Location setting must be overridden. The Runtime Location should contain the absolute path to the directory that PCJava is installed.

Figure 36:
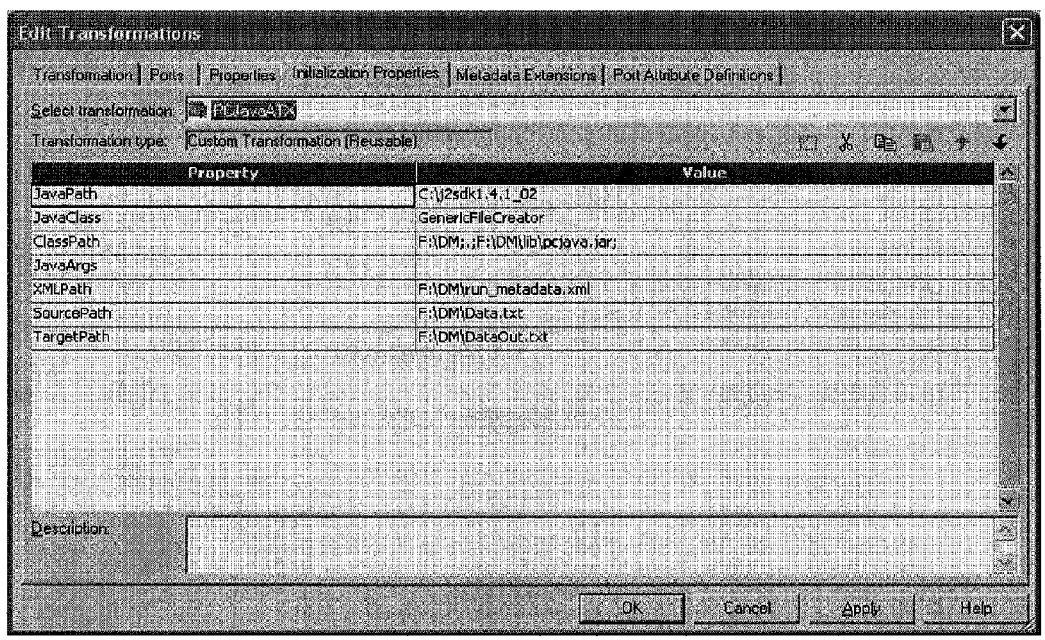

Then proceed to the Initialization Properties page as shown in FIG. 36, configuring as shown.

Figure 37:
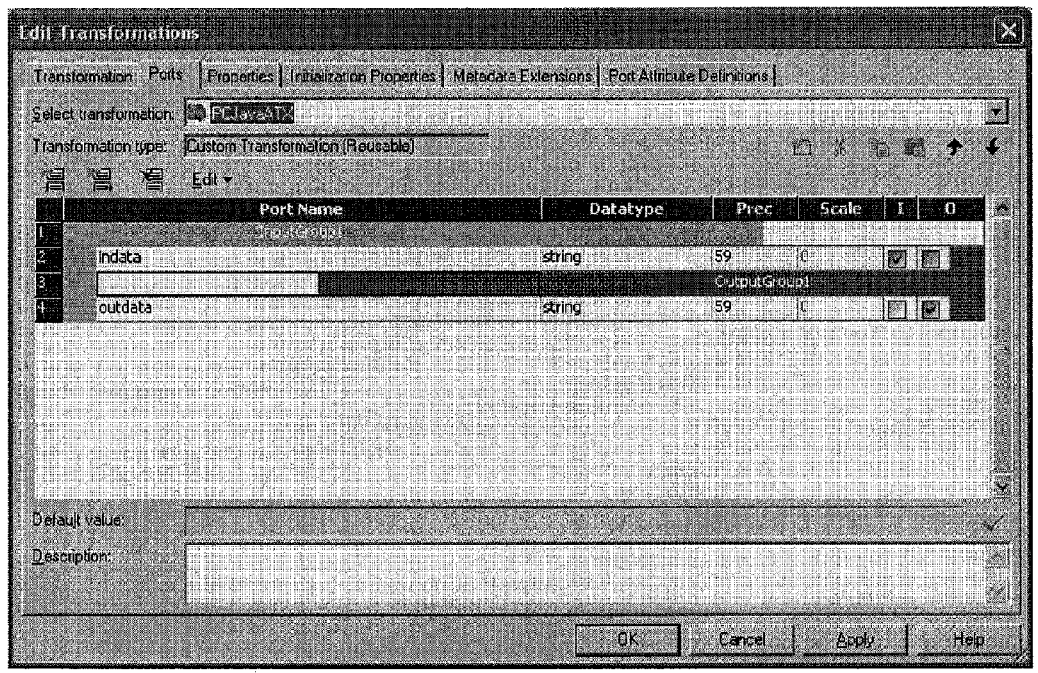

The port tab defines input and output ports as shown in FIG. 37.

The changes can be saved to the repository, and the mapping created.

A sample mapping is created to read records from a flat file and invoke the custom transformation. The custom transformation can create a flat file from the records and invoke the data masking tool to process the file. After the data masking operation is completed, the records in the masked output file are fed back to the INFORMATICA software, which creates a target file.

Figure 38:
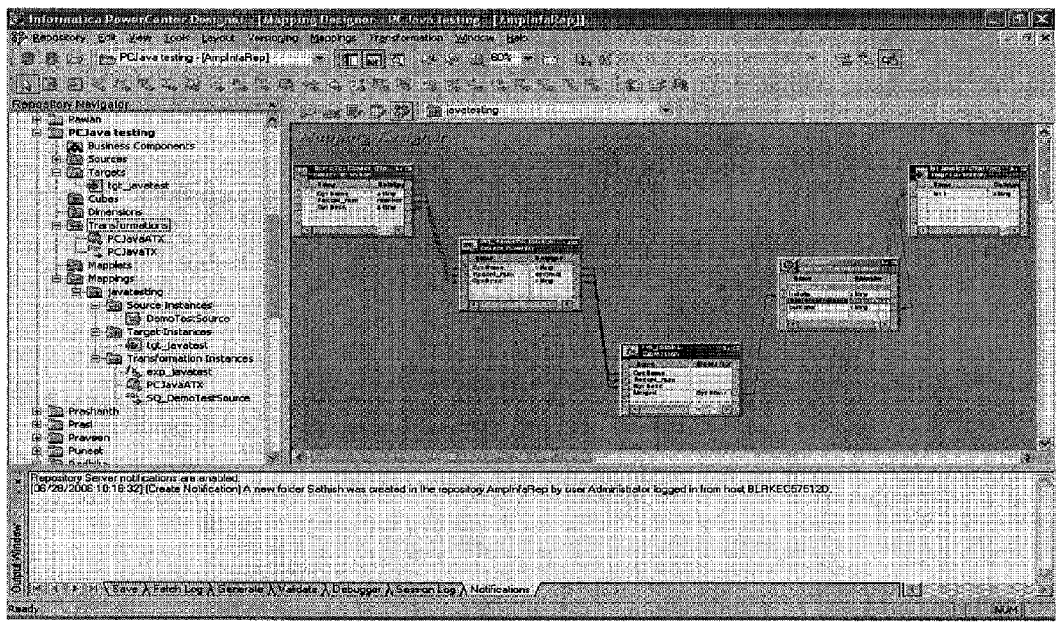

A sample mapping is shown in FIG. 38.

Figure 39:
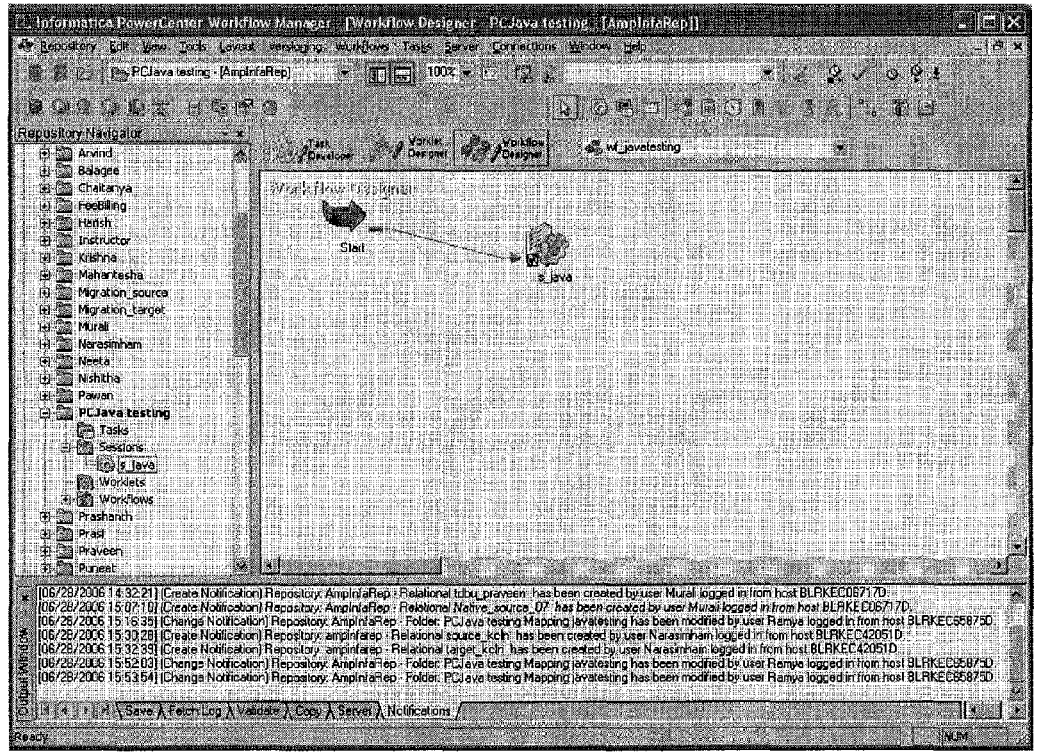

After the mapping is stored in the repository, a reusable workflow component can be created to execute the flow as shown in FIG. 39.

The following operational steps can be performed:
  The flat file containing the data to be masked can be placed in the source file directory of the INFORMATICA software
  Each record in the flat file can be picked up by the INFORMATICA software and passed to the custom transformation component
  The custom transformation component creates a flat file of all the records and invokes the data masking tool
  The data masking tool masks the data in the flat file as per the rules specified in its configuration XML and generates an output flat file consisting of the masked data
  The masked data file is further loaded into the INFORMATICA software by the custom transformation.
  The INFORMATICA software then creates the target file in the Target directory.

The data masking tool can perform the following:
  The data masking tool provides masking functionality based on the predefined rules and configurable number of columns specified in the controller XML file.
  A stand alone data mask application can service connections to a socket which obtains the path to the controller XML file as a message.
  The service responds to the requesting application on completion of masking.
  To start the data mask application, a script (e.g., Mask.sh) can be executed, which in turn can run a Java program (e.g., Provider.java).

The custom transform can perform the following:
  The masking custom transform invokes a Java program which uses the PCJava APIs of the INFORMATICA software to create a flat file from the input records and load back the output records back to the INFORMATICA software.
  The properties set for the custom transform specifies the location of the masking XML file, Input data file and the name of the output data file to be created.
  This Java program then connects to the masking application using sockets to mask the records in the flat file created.
  The custom transformation Java program completes execution after loading the masked records back to the INFORMATICA software.

EXAMPLE 25

Exemplary Uses

The technologies described herein can be used in any of a variety of scenarios but are particularly useful in the field of software development, such as in software testing. Data masking as described herein can be applied to production data to generate test data suitable for use in testing environments.

Because the data can be pulled across technology platform types, it is possible, for example, to pull data from a live mainframe environment onto a desktop (e.g., microcomputer) environment as part of the masking process. This can be helpful if testing is taking place on the microcomputer environment. For example, the data can be tested in place or easily transferred to another microcomputer.

EXAMPLE 26

Exemplary Randomization

In any of the examples herein, randomization can be achieved via a random number generator that applies a Mersenne Twister random number generation technique. For example, data shuffling can be achieved via such a random number generator. A Mersenne Twister random number generation technique can exhibit very high periodicity and other advantages.

EXAMPLE 27

Exemplary Computing Environment

Figure 40:
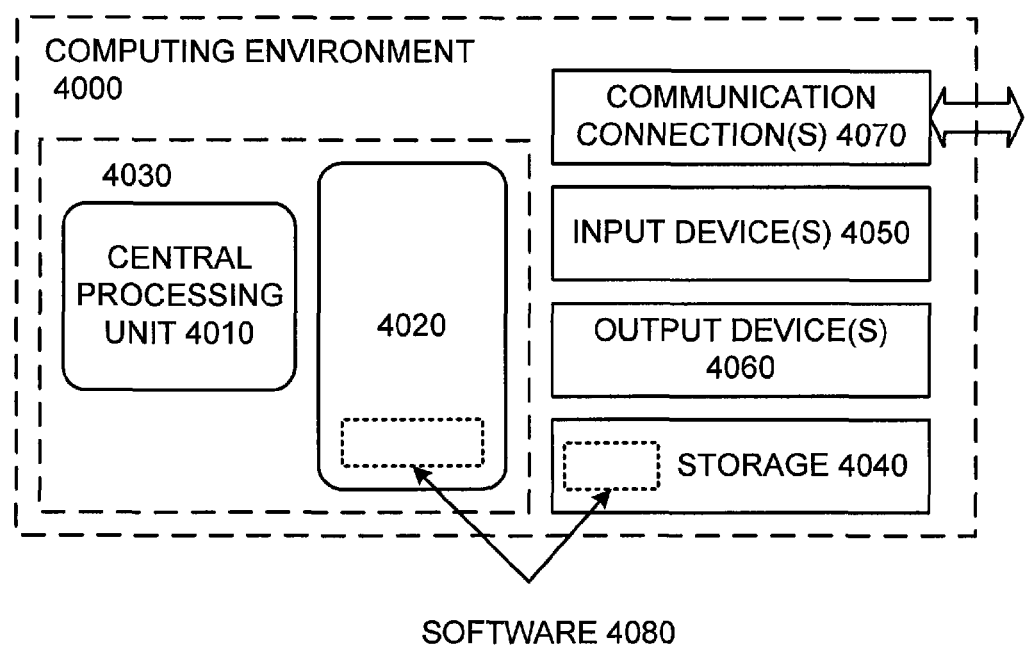
FIG. 40 is a block diagram of an exemplary suitable computing environment for implementing any of the technologies described herein.

FIG. 40 illustrates a generalized example of a suitable computing environment 4000 in which the described techniques can be implemented. The computing environment 4000 is not intended to suggest any limitation as to scope of use or functionality, as the technologies may be implemented in diverse general-purpose or special-purpose computing environments. A mainframe environment will be different from that shown, but can also implement the technologies and can also have computer-readable media, one or more processors, and the like.

With reference to FIG. 40, the computing environment 4000 includes at least one processing unit 4010 and memory 4020. In FIG. 40, this most basic configuration 4030 is included within a dashed line. The processing unit 4010 executes computer-executable instructions and may be a real or a virtual processor. In a multi-processing system, multiple processing units execute computer-executable instructions to increase processing power. The memory 4020 may be volatile memory (e.g., registers, cache, RAM), non-volatile memory (e.g., ROM, EEPROM, flash memory, etc.), or some combination of the two. The memory 4020 can store software 4080 implementing any of the technologies described herein.

A computing environment may have additional features. For example, the computing environment 4000 includes storage 4040, one or more input devices 4050, one or more output devices 4060, and one or more communication connections 4070. An interconnection mechanism (not shown) such as a bus, controller, or network interconnects the components of the computing environment 4000. Typically, operating system software (not shown) provides an operating environment for other software executing in the computing environment 4000, and coordinates activities of the components of the computing environment 4000.

The storage 4040 may be removable or non-removable, and includes magnetic disks, magnetic tapes or cassettes, CD-ROMs, CD-RWs, DVDs, or any other computer-readable media which can be used to store information and which can be accessed within the computing environment 4000. The storage 4040 can store software 4080 containing instructions for any of the technologies described herein.

The input device(s) 4050 may be a touch input device such as a keyboard, mouse, pen, or trackball, a voice input device, a scanning device, or another device that provides input to the computing environment 4000. For audio, the input device(s) 4050 may be a sound card or similar device that accepts audio input in analog or digital form, or a CD-ROM reader that provides audio samples to the computing environment. The output device(s) 4060 may be a display, printer, speaker, CD-writer, or another device that provides output from the computing environment 4000.

The communication connection(s) 4070 enable communication over a communication medium to another computing entity. The communication medium conveys information such as computer-executable instructions, audio/video or other media information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Communication media can embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. Communication media include wired media such as a wired network or direct-wired connection, and wireless media such as acoustic, RF, infrared and other wireless media. Combinations of any of the above can also be included within the scope of computer readable media.

The techniques herein can be described in the general context of computer-executable instructions, such as those included in program modules, being executed in a computing environment on a target real or virtual processor. Generally, program modules include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing environment.

Methods in Computer-Readable Media

Any of the methods described herein can be implemented by computer-executable instructions in one or more computer-readable media (e.g., computer-readable storage media or other tangible media). The technologies described herein can be implemented in a variety of programming languages.

ALTERNATIVES

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. We therefore claim as our invention all that comes within the scope and spirit of these claims.

We claim:

1. A data masking tool encoded on one or more computer readable storage media not consisting of a signal, the data masking tool comprising:
   a masking rule engine configured to apply a plurality of masking rules to source data, the masking rules comprising static substitution rules, dataset substitution rules, random substitution rules, shuffling rules, and encryption rules; and
   an application programming interface configured to receive a command to perform data masking on the source data as indicated by specified masking configuration data, wherein the application programming interface is configured to receive an indication of the specified masking configuration data;
   wherein the masking configuration data comprises an indication of which of the plurality of masking rules are to be applied to the source data; and
   wherein the data masking tool is configured to apply the masking rule engine to the source data and generate masked data as indicated by the masking configuration data.

2. The data masking tool of claim 1 wherein:
   the data masking tool is configured to output masking configuration data as extensible markup language (XML); and
   the data masking tool is configured to input masking configuration data as XML.

3. The data masking tool of claim 1 wherein:
   the data masking tool is configured to connect to a metadata management tool, receive metadata regarding the source data from the metadata management tool, and store the metadata regarding the source data as data masking configuration information.

4. The data masking tool of claim 1 wherein:
   the data masking tool is configured to be executed from a web-driven user interface, a command line, a service oriented architecture endpoint, and a hosting application.

5. The data masking tool of claim 1 wherein:
   the data masking tool is configured to accept source data in a flat file format; and
   the data masking tool is configured to accept source data in a database format.

6. The data masking tool of claim 1 wherein:
   the data masking tool is configured to accept source data from a plurality of different technology platform types.

7. The data masking tool of claim 1 wherein:
   the data masking tool is configured to accept source data in a flat file format;
   the data masking tool is configured to determine from the source data in the flat file format, column names of a table represented in the flat file format; and
   the data masking tool presents columns for the table represented in the flat file format with the column names in a user interface by which a user can select data masking rules for respective of presented columns.

8. The data masking tool of claim 1 wherein the application programming interface is configured to receive a location of a masking configuration file containing the masking configuration data.

9. The data masking tool of claim 1 wherein the application programming interface is configured to receive a location of the source data.

10. The data masking tool of claim 1 wherein the data masking tool is configured to be invoked by a custom transformation in a host application.

11. The data masking tool of claim 10 wherein the source data resides on a mainframe computer system.

12. The data masking tool of claim 10 wherein the host application serves as a broker between the data masking tool and a mainframe computer system.

13. The data masking tool of claim 10 wherein the host application serves as a broker between the data masking tool and a database.

14. The data masking tool of claim 1 wherein:
the masking rule engine is configured to shuffle records via a Mersenne Twister random number generation technique.

15. A method of masking data, the method comprising:
in a computing environment comprising at least one processing unit and memory, receiving a call to an application programming interface configured to receive a command to perform data masking on source data as indicated by specified masking configuration data, wherein the application programming interface is configured to receive an indication of the specified masking configuration data, and wherein the masking configuration data comprises an indication of which of a plurality of masking rules are to be applied to the source data;
in the computing environment comprising the at least one processing unit and memory, responsive to receiving the call to the application programming interface, reading the specified masking configuration data and applying a masking rule engine to the source data, wherein the masking rule engine is configured to apply a plurality of masking rules to source data, the masking rules comprising static substitution rules, dataset substitution rules, random substitution rules, shuffling rules, and encryption rules; and
in the computing environment comprising the at least one processing unit and memory, outputting masked data via the masking rule engine as indicated by rules in masking configuration data.

16. One or more computer-readable storage media not consisting of a signal and comprising computer-executable instructions causing a computer to perform a method of masking data, the method comprising:
receiving a call to an application programming interface configured to receive a command to perform data masking on source data as indicated by specified masking configuration data, wherein the application programming interface is configured to receive an indication of the specified masking configuration data, and wherein the masking configuration data comprises an indication of which of a plurality of masking rules are to be applied to the source data;
responsive to receiving the call to the application programming interface, reading the specified masking configuration data and applying a masking rule engine to the source data, wherein the masking rule engine is configured to apply a plurality of masking rules to source data, the masking rules comprising static substitution rules, dataset substitution rules, random substitution rules, shuffling rules, and encryption rules; and
outputting masked data via the masking rule engine as indicated by rules in masking configuration data.

* * * * *

UNITED STATES PATENT AND TRADEMARK OFFICE
CERTIFICATE OF CORRECTION

| | |
|---|---|
| PATENT NO. | : 7,917,770 B2 |
| APPLICATION NO. | : 11/869690 |
| DATED | : March 29, 2011 |
| INVENTOR(S) | : Gopinath et al. |

It is certified that error appears in the above-identified patent and that said Letters Patent is hereby corrected as shown below:

In the Specification

Column 3, line 5, "tool 150" should read --tool 120--;

Column 3, line 18, "can used" should read --can be used--;

Column 4, line 10, "tool 320" should read --tool 120--;

Column 5, line 4, "configuration data 770" should read --configuration data 755--;

Column 5, line 9, "tool 720" should read --tool 120--;

Column 5, line 29, "unmasked data 810" should read --unmasked data 110--;

Column 5, lines 29-30, "masked data 880" should read --masked data 180--;

Column 6, line 2, "plug in" should read --plug-in--;

Column 8, line 55, "displays" should read --display--;

Column 11, line 33, "fixed with files" should read --fixed width files--;

Column 11, line 48, "though" should read --through--;

Column 11, line 53, "Either" should read --Any--;

Column 13, line 7, "Sequential Date" should read --'Sequential Date'--;

Column 13, line 11, "Substitution" should read --Substitution'--;

Column 13, line 12, "Substitution" should read --Substitution'--;

Column 13, line 48, "with a static values" should read --with static values--;

Column 13, line 59, "a data" should read --a date--;

Column 14, line 65, "pmjava2.dll" should read --pcjava2.dll--;

Column 15, line 52, "specifies" should read --specify--.

Signed and Sealed this

Thirteenth Day of November, 2012

David J. Kappos
*Director of the United States Patent and Trademark Office*